(12) United States Patent
Petrov

(10) Patent No.: US 9,857,018 B2
(45) Date of Patent: Jan. 2, 2018

(54) METAL-CONTAINING POLYMERIC REINFORCED PIPE, METHOD FOR MANUFACTURING SAME AND PIPELINE PRODUCED USING SAID PIPE

(76) Inventor: Yuriy Maksimovich Petrov, Moscow (RU)

( * ) Notice: Subject to any disclaimer, the term of this patent is extended or adjusted under 35 U.S.C. 154(b) by 419 days.

(21) Appl. No.: 14/383,502

(22) PCT Filed: Aug. 27, 2012

(86) PCT No.: PCT/RU2012/000698
§ 371 (c)(1),
(2), (4) Date: Sep. 5, 2014

(87) PCT Pub. No.: WO2013/137770
PCT Pub. Date: Sep. 19, 2013

(65) Prior Publication Data
US 2015/0059911 A1  Mar. 5, 2015

(30) Foreign Application Priority Data

Mar. 14, 2012 (RU) ................................ 2012109608
Mar. 28, 2012 (RU) ................................ 2012111990
May 21, 2012 (RU) ................................ 2012120788

(51) Int. Cl.
*B21C 37/09* (2006.01)
*F16L 57/00* (2006.01)
(Continued)

(52) U.S. Cl.
CPC .............. *F16L 57/00* (2013.01); *B23K 9/22* (2013.01); *B29C 47/0023* (2013.01);
(Continued)

(58) Field of Classification Search
CPC ... B29C 47/021; B29C 47/023; B29C 47/882; B29C 47/902; B29C 66/83413;
(Continued)

(56) References Cited

U.S. PATENT DOCUMENTS 2,730,761 A * 1/1956 Castellan .............. B29C 47/023
156/144
3,393,427 A * 7/1968 Larsen ................ B29C 47/0023
264/176.1

(Continued)

FOREIGN PATENT DOCUMENTS

RU          7722 U1    9/1998
RU       2202727 C1    4/2003
(Continued)

*Primary Examiner* — Edward Tolan
(74) *Attorney, Agent, or Firm* — Andrew W. Chu; Craft Chu PLLC

(57) ABSTRACT

The polymeric pipes reinforced with a metal casing are used for transporting oil and gas, acids, alkali products, drinking water and industrial water, and also in the transportation of aggressive and neutral pulps. A metal-containing polymeric reinforced pipe includes a welded metal casing and a polymeric matrix having an amorphous-phase-based molecular structure. The metal-containing polymeric reinforced pipe is produced by extrusion moulding with simultaneous feeding of a polymer melt and the reinforcing metal casing into the mould cavity, followed by intensive cooling of the internal and external surfaces of the pipe being moulded. The invention increases the quality and endurance limit in the radial direction of the metal-containing polymeric reinforced pipe, productivity of the process for manufacturing the pipe, and also the strength and technological effectiveness of a pipeline constructed from the pipes produced.

3 Claims, 13 Drawing Sheets

(51) Int. Cl.
| | |
|---|---|
| F16L 13/02 | (2006.01) |
| F16L 15/00 | (2006.01) |
| B29D 23/00 | (2006.01) |
| B29C 47/00 | (2006.01) |
| B29C 47/04 | (2006.01) |
| B29C 47/10 | (2006.01) |
| B29C 65/20 | (2006.01) |
| B29C 65/56 | (2006.01) |
| B29C 65/00 | (2006.01) |
| F16L 9/147 | (2006.01) |
| F16L 19/02 | (2006.01) |
| F16L 23/024 | (2006.01) |
| F16L 23/18 | (2006.01) |
| F16L 41/02 | (2006.01) |
| F16L 43/00 | (2006.01) |
| B29C 47/02 | (2006.01) |
| F16L 47/02 | (2006.01) |
| B23K 9/22 | (2006.01) |
| F16L 9/128 | (2006.01) |
| B29C 47/88 | (2006.01) |
| B29C 47/90 | (2006.01) |
| F16L 47/03 | (2006.01) |
| F16L 47/14 | (2006.01) |
| F16L 47/04 | (2006.01) |
| B29C 47/34 | (2006.01) |
| B29C 47/86 | (2006.01) |
| B29K 305/00 | (2006.01) |
| B29L 23/00 | (2006.01) |
| B29K 101/00 | (2006.01) |
| B29K 705/00 | (2006.01) |
| B29K 705/02 | (2006.01) |
| B29K 705/08 | (2006.01) |
| B29K 705/10 | (2006.01) |
| B29K 705/12 | (2006.01) |
| B29L 31/24 | (2006.01) |
| F16L 47/16 | (2006.01) |

(52) U.S. Cl.
CPC ............ *B29C 47/023* (2013.01); *B29C 47/04* (2013.01); *B29C 47/1036* (2013.01); *B29C 47/882* (2013.01); *B29C 47/902* (2013.01); *B29C 65/20* (2013.01); *B29C 65/561* (2013.01); *B29C 65/562* (2013.01); *B29C 66/1142* (2013.01); *B29C 66/1222* (2013.01); *B29C 66/1224* (2013.01); *B29C 66/5221* (2013.01); *B29C 66/5223* (2013.01); *B29C 66/52231* (2013.01); *B29C 66/52241* (2013.01); *B29C 66/52292* (2013.01); *B29C 66/52296* (2013.01); *B29C 66/52298* (2013.01); *B29C 66/7212* (2013.01); *B29C 66/72141* (2013.01); *B29C 66/73771* (2013.01); *B29C 66/8161* (2013.01); *B29C 66/8221* (2013.01); *B29C 66/8242* (2013.01); *B29C 66/83413* (2013.01); *B29D 23/001* (2013.01); *F16L 9/128* (2013.01); *F16L 9/147* (2013.01); *F16L 13/02* (2013.01); *F16L 15/00* (2013.01); *F16L 19/0206* (2013.01); *F16L 23/024* (2013.01); *F16L 23/18* (2013.01); *F16L 41/021* (2013.01); *F16L 43/002* (2013.01); *F16L 43/008* (2013.01); *F16L 47/02* (2013.01); *F16L 47/03* (2013.01); *F16L 47/04* (2013.01); *F16L 47/14* (2013.01); *B21C 37/09* (2013.01); *B29C 47/0066* (2013.01); *B29C 47/34* (2013.01); *B29C 47/864* (2013.01); *B29C 66/71* (2013.01); *B29C 66/7313* (2013.01); *B29C 66/7315* (2013.01); *B29C 66/7352* (2013.01); *B29C 66/7392* (2013.01); *B29C 66/7394* (2013.01); *B29C 66/73115* (2013.01); *B29C 66/73921* (2013.01); *B29C 66/73941* (2013.01); *B29C 66/81265* (2013.01); *B29D 23/00* (2013.01); *B29D 23/006* (2013.01); *B29D 23/008* (2013.01); *B29K 2101/00* (2013.01); *B29K 2305/00* (2013.01); *B29K 2705/00* (2013.01); *B29K 2705/02* (2013.01); *B29K 2705/08* (2013.01); *B29K 2705/10* (2013.01); *B29K 2705/12* (2013.01); *B29K 2995/0072* (2013.01); *B29K 2995/0089* (2013.01); *B29L 2023/22* (2013.01); *B29L 2031/243* (2013.01); *B29L 2031/246* (2013.01); *F16L 47/16* (2013.01)

(58) Field of Classification Search
CPC . B29C 66/7377; B29C 66/73771; B23K 9/22; B21C 37/08; B21C 37/083; B21C 37/09; B21C 37/154
See application file for complete search history.

(56) References Cited

U.S. PATENT DOCUMENTS

| | | | | |
|---|---|---|---|---|
| 3,920,170 | A * | 11/1975 | Colburn | B21F 27/124 140/112 |
| 4,202,718 | A * | 5/1980 | Mizutani | B29C 47/02 156/171 |
| 4,314,129 | A * | 2/1982 | Wilson | B01D 29/111 140/112 |
| 4,517,039 | A * | 5/1985 | Satzler | B29C 47/0023 156/149 |
| 5,851,477 | A * | 12/1998 | Halgren | A61M 25/0009 264/103 |
| 6,604,761 | B1 | 8/2003 | Debalme et al. | |
| 7,192,499 | B1 * | 3/2007 | Talley, Jr. | D04H 3/16 156/167 |

FOREIGN PATENT DOCUMENTS

| | | |
|---|---|---|
| RU | 2319886 C2 | 3/2008 |
| WO | 2012018713 A1 | 2/2012 |

* cited by examiner

METAL-CONTAINING POLYMERIC REINFORCED PIPE, METHOD FOR MANUFACTURING SAME AND PIPELINE PRODUCED USING SAID PIPE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to polymeric pipes reinforced by a metal framework, to a method for producing and optimal variants of using them. Both the strength of a metal framework and the chemical stability of a polymeric matrix enable to use metal-polymeric (metal-plastic) pipes in various fields of economy, in particular, for transportation of oil and gas, acids, alkaline products, drinking and process waters, and the high stability against abrasive wear enables to use them for transportation of corrosive and neutral pulps and as case pipes, e.g., in a case of underground leaching of rocks.

2. Description of Related Art Including Information Disclosed Under 37 CFR 1.97 and 37 CFR 1.98.

A metal-polymeric reinforced pipe is known that comprises a welded metal framework and a polymeric matrix; it is described in USSR Inventor's Certificate No. SU1366757 published on Jan. 15, 1988. A drawback of this pipe is a complex combined structure of the polymeric matrix that is produced in two steps. First, the inner layer of the polymeric matrix is formed, a metal framework is embedded into it, and then the upper, coating thermoplastic layer is formed, the inner layer and the outer layer of the pipe being provided with a complex surface profile in order the profiles may engage with, and the layers may adhere to, each other.

A metal-polymeric reinforced pipe that is known from GB Patent No. GB2277975, which is published on Nov. 16, 1994, is simpler and more durable. This pipe has a monolith, thermoplastic polymeric matrix having, primarily, a crystalline structure and being produced by extrusion, and a reinforcing metal framework made of longitudinal reinforcing elements and at least two transverse spiral reinforcing elements.

A drawback of this pipe is its low long-term strength at thermal cyclic loads.

The closest analogous solution to the claimed invention is a metal-polymeric reinforced pipe that is described in USSR Inventor's Certificate No. SU929951, which is published on May 23, 1982, and that comprises: a metal net framework rigidly fixed by welding in crossing points of reinforcing elements, and a polymeric matrix produced by extrusion molding. Further, in order to improve resistance to radial loads, the thicknesses of the inner wall and the outer wall are selected in the range from 0.2 to 0.8 of the framework thickness.

However, as ascertained in practice, the strength of a metal-polymeric reinforced pipe, in particular its ability to resist radial loads, is determined mainly not by a ratio of the reinforcing framework thickness and the pipe wall thickness, but, rather, by the ability of the "metal-polymer" pair to relax inner stresses arising under the action of loads on a pipe, which enables to maintain the integrity of a polymeric matrix without allowing cracking the pipe body.

A metal framework and a polymer are heated to the same temperature in the process of pipe production. During their subsequent cooling with equal (close value) gradients, both the metal and the polymer shrink, but shrinkage of the polymer is greater in per cent. Thus, after cooling, a gap remains between the metal framework and the polymer matrix, which gap allows the structure elements to be in a mutually balanced state, that is, in particular, the polymer allows elastic deformation of the framework when the latter is acted on by loads, thus relaxing arising stresses. Furthermore, such a gap allows long relaxation of the polymer without forming large spherulites. In this connection, the more is an amount of a polymer in a cross-section of a pipe, the lower is the polymer relative ability to relax arising stresses. That is, an increase in the inner layer and/or the outer layer of a polymer, as Inventor's Certificate No. SU929951 states, does not allow to improve strength properties of a pipe.

On the other side, a significant increase in a thickness of a polymer layer on a pipe framework is unacceptable, since a definite minimum dimension of the polymer matrix body is required for process purposes, for example, for assembling a pipeline or a pipe string, as well as for obtaining the possibility of repairing a pipeline.

Moreover, in addition to critical observations in respect of the invention under SU929951, it may be stated that it is established, on the basis of experimental works carried out, that the radial strength of a metal-polymeric pipe is mainly determined by the physical properties and parameters of a metal framework, such as: a framework unit cell dimension, dimensions of longitudinal and transverse reinforcing elements, or the strength of a welded connection, rather than selection of a pipe wall thickness.

In the method of producing the claimed metal-polymeric pipe significant attention was paid exactly to improving the strength of the reinforcing framework for a metal-polymeric pipe, which enabled to eliminate problems existing in the production of high-quality pipes, which problems were not removed in the existing state of the art.

A method for continuous making of a reinforced polymeric pipe and a device therefor are known in the art, which are described in Patent SU1716963 published on Feb. 29, 1992. This method comprises feed of a polymer melt into an annular mold cavity of an extruder with the simultaneous feed a reinforcing framework into it. For the purpose of reducing residual internal stresses in the pipe wall an angle between polymer feed and a direction of framework movement is selected in the range from 90° to 150°. The device comprises an extruder having a head with a central feeding passage for a melt. The annular mold cavity used for forming a pipe is composed from a mandrel and a barrel and communicates with the extrusion passage. The outlet region of the extrusion passage is made with a space angle in the range from 60° to 180°, the vertex of this angle facing the exit of the mold cavity.

The reasons for residual internal stresses arising in the wall of a metal-polymer pipe are, in particular, friction forces arising between an extrudate and the extrusion passage walls, and, after leaving an extrusion head, friction forces arising between an extrudate and the mold cavity walls with subsequent fixation of the polymer stressed state during curing in the result of the produced pipe cooling. This stressed state at the macrostructural level is characterized by the longitudinal orientation of the polymer macromolecules that is most prominent in the areas adjacent to a mandrel. It was supposed that the making of the extrusion passage outlet region with a space angle in the range from 60° to 180°, which vertex faced the exit of the mold cavity, would contribute to violation of a polymer melt laminar flow within the extrusion passage, since a melted polymer flow, which experienced a sharp turn when exiting the extrusion passage and entering the mold cavity, created violations in the polymer macrostructural orientation formed in the extrusion passage, and a subsequent orientation of the polymer macromolecules in the mold cavity began with the polymer disoriented state. Due to the fact that time is required for the macrostructural orientation process which is commensurate to the time of polymer passing through the mold cavity, it was supposed that stresses within a material by the time of curing would develop to a lesser degree.

The said supposition did not prove its value, and it was established in practice that the longitudinal orientation of polymer molecules occurred irrespective of an angle of leaving an extrusion passage, since before the beginning of the crystallization time orientation processes in the polymer melt structure are equilibrium. Therefore, no changes in angles and melt movement directions within an extrusion passage makes significant alterations in the process of spatial orientation of molecules in the polymer macrostructure.

A drawback of this technology is a non-optimal structure of a polymer matrix, which causes low indices of long-term strength of a pipe. Long-term strength is estimated by a method of thermal cyclic loading (thermal cycling) of specimens by cooling them in each cycle and keeping them for 3 hours at −40° C. with subsequently heating them to +80° C. and keeping for 3 hours. A number of cycles before destruction begins is, according to the specification to SU1716963, from 130 to 245.

The closest analogous solution to the claimed invention in respect of the method and the device for producing a metal-polymeric reinforced pipe are the method and the device disclosed in Patent No. RU 2319886 published on Mar. 20, 2008. This Patent teaches a method for continuous making of a metal-polymeric pipe by way of extrusion molding, according to which a reinforcing coil is winded with a pre-determined pitch onto longitudinal reinforcement elements strained and moved together with an extruded pipe, said elements being evenly distributed over the circumference, then, while being winded, it is welded to in succession crossed elements of longitudinal reinforcement by the electrocontact method with the use of a roll electrode that is rotated around the axis of a reinforcing coil. Welding current pulses are fed synchronously with times of crossing elements of longitudinal reinforcement. The formed reinforcing framework is introduced into a mold cavity, simultaneously feeding a melt of an extruded polymer into it. Reinforcing coils are arranged with mutual phase shift by an angle of 2 π/n, where n is a number of reinforcing coils. Welding is carried out by simultaneously using several pairs of roll electrodes, the number of which corresponds to a number of reinforcing coil pairs. The welding current is fed to each pair of roll electrodes autonomously. Thus, a number of roll electrode pairs is n/2, where n is a number of reinforcing coils. The central angle α for each electrode pair, that is measured between radii drawn between contact points of electrodes and longitudinal reinforcing coils is 120-240°.

And it should be noted that welding current is fed to each pair of roll electrodes via its pair of current-feeding collectors alternatively.

The device for carrying out the method according to Patent No. RU 2319886 comprises an extruder with a direct-flow head which is provided with an arbor having guiding slots for longitudinal reinforcement and a cooled mandrel. A welding machine provided with a drum installed on bearings is arranged downstream the extruder. The drum is provided with a reel for transverse reinforcement with the possibility of freely rotation, a deflecting roll for winding a reinforcing coil, roll electrodes for welding it to longitudinal reinforcement elements, and a current-feeding collector with isolated sections in a number equal to that of roll electrodes. A barrel is fixedly arranged within the drum, which forms a mold cavity together with a mandrel.

The number of roll electrode pairs is n/2, where n is the number of reinforcing coils, and the central angle α in each pair between the contact points between the electrodes and the transverse reinforcing coils is 120-240°. Each roll electrode of a pair is mounted onto a lever that has an eccentric rotation support. Levers on one side of eccentric rotation supports in each pair have counterbalances and are connected therebetween on the other side by a pneumatic cylinder with an indicator and a regulator of welding force. Roll welding electrodes in each pair are connected to each other, to the arbor and to a current source in series.

Drawbacks of the above-described method and device are low strength of welded connections of reinforcing metal framework of a pipe, which is obtained with the use of them, since the force of pressing the welding roll electrodes is provided by a pneumatic actuator that exerts less power than a hydraulic actuator. Also, a drawback of the welding mechanism structure is that a pulse value and time of feeding it to a roll do not correlate with time of crossing longitudinal reinforcement elements by transverse reinforcement elements, since the device description lacks a means for carrying out synchronous processes. The result is low strength of a pipe both in the axial and the radial directions.

Furthermore, as a drawback of the prototype, it may be said that the mandrel is arranged directly after the extrusion passage. A melt leaving the feeding passage of an extrusion head goes directly onto a cooled mandrel. A melt leaving the passage has a temperature that is higher than a polymer melting temperature (e.g., the melt temperature of polypropylene is app. 190-270° C.). A melt, which comes to the end and the rear part of a mandrel, transfers a part of its heat to the latter. In such a case, on one side, early cooling of the melt occurs, which causes the early beginning of crystallization process and adhesion of a polymer to a metal framework, which results in lowering the pipe cross-sectional strength. On the other side, the action of a melt high temperature on a mandrel at the time when the process technology provides for its cooling does not enable to control and adjust the polymer cooling process, determine accurately and correct the beginning point of its adhesion to the reinforcing framework and its crystallization. Consequences are drawbacks that arise in the polymer matrix structure of a pipe that consists of 70-90% crystallites (i.e., areas of high density) and of 10-30% amorphous areas (i.e., areas of chaotic molecular bonds or areas of low density). Such polymer structure is characterized by low flexibility. When significant radial and axial loads are applied to a pipe made of a polymer with such a structure, its cracking occurs; therefore, a pipe produced according to the prototype has low indices of long-term strength.

One more significant drawback of the prototype is the organization of welding process for a reinforcing framework. Welding is carried out with roll electrodes that are mounted in pairs only. A number of roll electrodes corresponds to a number of transverse reinforcement coils and is selected from the even numbers (2, 4, 6 . . . ). There is no possibility of selecting a number of reinforcing coils from the odd numbers, which narrows the range of construction possibilities when making a pipe.

A pneumatic cylinder is provided for in the structure of the welding mechanism, which cylinder exerts a force necessary for pressing longitudinal reinforcement elements to transverse reinforcement elements. The lever of one roll electrode is secured to the pneumatic cylinder body, the lever of another roll electrode is secured to the rod; these levers form a mutually connected pair. When the air is forced into the pneumatic cylinder, a distance between the axes of securing the levers to the rod and to the body of the pneumatic cylinder increases. Pressing uniformity depends mainly on correct arrangement of rotation supports of the lever mechanisms. If their correct arrangement is not achieved, then geometric characteristics of movements of the lever mechanisms, and, consequently, roll electrodes will be different. Differences in the geometric characteristics of the lever mechanism movements will have an effect on pressing quality of each individual roll to a coil. It directly leads to a difference in the directions of force vectors relative to the axis of symmetry in plan. If forces applied to the lever supports on the body and on the rod of the pneumatic cylinder are equal, but angles between the pressing vector of a roll and the axis of symmetry are different, different pressing forces arise. As the result, a product made according to the prototype is a metal-polymeric reinforced pipe having a reinforcing framework with periodically changing strength and quality of welding connections between reinforcing coils and longitudinal reinforcement.

The claimed invention is aimed at eliminating the above-described drawbacks during development of a method for continuous making of a metal-polymeric reinforced pipe and a device for carrying out same and at guaranteed production of high-quality metal-polymeric reinforced pipes.

A pipeline is known in the art that is composed of metal-polymeric reinforced pipes and is described in Patent No. EP 1577077 dated Sep. 21, 2005, wherein pipes are connected with the use of electric-welded couplings. The use of electric-welded couplings for each connection makes the pipeline construction unnecessarily expensive; moreover, pipe connections are made permanent, which lowers workability of a pipeline, makes repair works more difficult as well as does not ensure the possibility of making connections between polymeric and metal pipes.

Several patents owned by Zapsibgasprom Ltd teach connection of plastic reinforced pipes by butt welding with subsequent tying of flange couplings. Couplings are provided with thread and have the possibility of moving axially. The said couplings are metal. (See: Patents Nos. RU2202727, RU2217311, RU33634). Differences in linear thermal expansion coefficients of a material of a metal coupling and a polymeric material of the matrix of a plastic reinforced pipe lead to delamination of such connection including a metal coupling and a metal-polymeric pipe at a change in external temperature or a change in temperature of a product transported via a pipeline.

In order to connect two ends of a metal-plastic pipe more reliably, it is necessary to provide them with connecting elements, so-called edge couplings that are rigidly fixed on the pipe ends.

The closest analogous solution for a pipeline connecting element is disclosed in the specification to Patent No. RU2085383 (published on Jul. 27, 1997) granted for "Method for radial friction welding of tubular parts based on polyolefines". The pulling to the said patent shows a polymeric edge part with a protrusion of the back side, which protrusion closes reinforcement outlets on a pipe. The edge part has thread on the external surface, but has no thread on the internal surface, since is connected to a pipe by friction welding.

An edge part is mounted onto a fixed pipe with prepared contact surface by reciprocal movements. This method provides a connection having necessary strength and tightness.

The drawbacks of this connection are high labor-intensity and lack of possibility of using it in the field, directly on a pipeline, without dismounting and transportation to a production site.

The proposed connecting element and pipeline have no drawbacks described above.

SUMMARY OF THE INVENTION

The claimed invention is aimed at solving the task to create a technology for producing a high-strength and high-quality metal-polymeric reinforced pipe with the use of efficient equipment as well as to ensure the possibility of constructing a pipeline of pipes thus produced.

The technical effect of the invention is improvement of quality and long-term strength in the radial direction of a metal-polymeric reinforced pipe together with increasing productivity of the process of making it as well as improvement of strength and workability of a pipeline constructed of pipes thus produced.

Improvement in strength characteristics of a metal-polymeric pipe includes improvement of strength of a metal framework in the axial and radial directions as well as improvement of the structure of a polymer matrix that, in the result of applying the claimed technology, possesses flexibility and plasticity alongside with lowering polymer-to-reinforcement adhesion properties, which, in its turn, entails lack of cracking of the pipe polymer matrix during thermal cyclic loading (thermal cycling).

Improvement in pipe quality includes improvement of dimensional stability indices of a reinforcing framework arranged in the matrix of a molded pipe.

An advantage of the claimed technology is improvement in productivity and service life of equipment, as compared to the existing analogous solutions, and resulting lower costs of production of a metal-polymeric pipe and construction of a pipeline.

Improvement in strength and workability indices is ensured by high quality and strength of metal-polymeric reinforced pipes (safety factor of pipes is in the range from 2 to 4.75, depending on a pipe diameter in the range from 95 to 225 mm) as well as by strength and reliability of releasable and permanent connections of pipes in a pipeline, which are made with the use of connecting elements developed.

Furthermore, reliability of a constructed pipeline is ensured by its high stability to abrasion wear and to action of corrosive agents of natural and industrial origin, such as: sea water, soil-corrosive atmosphere, sulfurous gas, chlorides and other corrosive salts as well as various acids and alkalis.

For the purpose of solving the set task a metal-polymeric reinforced pipe is claimed that comprises a welded metal framework and a polymer matrix produced by a method of extrusion molding, the polymer matrix is molded of a polymer having the molecular structure on the basis of an amorphous phase, preferably comprising the amorphous phase in an amount of 60-90% of the total polymer volume, and a metal framework is produced with the shearing strength of each welding connection of longitudinal and transverse reinforcing elements at least 35 kgf.

The claimed metal-polymeric reinforced pipe, preferably, has the following design values: its outer diameter is 50-1000 mm, a distance between the transverse enforcement elements, i.e., a pitch between coil turns, is s . . . 6 s, in millimeters, where s is section value of the longitudinal reinforcement and the transverse reinforcement and is selected from the range of 0.2-16 millimeters with the pitch of 0.1 mm.

As longitudinal and transverse reinforcing elements of a welded metal framework the claimed metal-polymeric reinforced pipe may comprise a variety of variants of metal wire or metal rod, or metal structural shapes of various section, for example, of round section, trapezoid section, oval section, cross-section of variable radius, and flat metal roll having the shape of a band. It should be noted that the strength of framework element connection becomes higher, if it is made of reinforcing elements connected therebetween by flat faces, for example, reinforcing elements of round section.

As longitudinal and transverse reinforcing elements of a welded metal framework, the metal-polymeric reinforced pipe comprises a wire, a rods or a structural metal roll, which is made of steel or of alloys on the basis of non-ferrous or ferrous metals, in particular, of alloys on the basis of iron, chrome, nickel or copper.

As the polymer matrix, the metal-polymeric reinforced pipe may comprise both thermoplastics and thermosetting plastics, in particular, any polymer selected from a group comprising: polyethylene, fluoroplastic, polyesterketone, polyestersulfon, polyurethane, polyvinylchloride, polyamide and thermoplastic vulcanized elastomer.

If the claimed metal-polymeric reinforced pipe comprises polyethylene as the polymer matrix, its composite impact resistance is at least 427 kJ/m$^2$, the pipe operating pressure is at least 40 atm, and the operation temperature mode is in the range from minus 50 to plus 95 degrees Centigrade.

In operation a metal-polymeric reinforced pipe with the polyethylene matrix is characterized by a high long-term strength at thermal cyclic loads, its long-term stability exceeds 1,200 cycles at cyclic temperature changes from −40° C. to +80° C.

If the claimed metal-polymeric reinforced pipe comprises fluoroplastic as the polymer matrix, its operating pressure is at least 40 atm, and the operation temperature mode is in the range from minus 150 to plus 260° C.

If the claimed metal-polymeric reinforced pipe comprises polyesterketone as the polymer matrix, then the operating pressure is at least 40 atm, and the operation temperature mode is in the range from minus 90 to plus 260° C.

If the claimed metal-polymeric reinforced pipe comprises polyestersulfon as the polymer matrix, then its operating pressure is at least 40 atm, and the operation temperature mode is in the range from minus 100 to plus 200° C.

If the claimed metal-polymeric reinforced pipe comprises polyurethane as the polymer matrix, then its operating pressure is at least 40 atm, and the operation temperature mode is in the range from minus 70 to plus 170° C.

If the claimed metal-polymeric reinforced pipe comprises thermoplastic vulcanized elastomers on the basis of polyolefines as the polymer matrix, then the operating pressure is at least 40 atm, and the operation temperature mode is in the range from minus 60 to plus 130° C.

If the claimed metal-polymeric reinforced pipe comprises polyvinylchloride as the polymer matrix, then the operating pressure is at least 40 atm, and the operation temperature mode is in the range from minus 10 to plus 70° C.

If the claimed metal-polymeric reinforced pipe comprises polyamide (PA-6, PA-12, etc.) as the polymer matrix, then the operating pressure is at least 40 atm, and the operation temperature mode is in the range from minus 60 to plus 115° C.

The claimed metal-polymeric reinforced pipe may be produced by extrusion molding with simultaneous feeding of a polymer melt and a reinforcing metal framework into the mold cavity, with subsequent intensive cooling of the inner and external surfaces of a pipe molded.

The method for producing a metal-polymeric pipe includes feeding of a polymer melt from the extrusion head passage into mold cavity formed by a cooled mandrel and the external mold barrel, with the simultaneous feeding of a welded metal reinforcing framework made with the use of at least one roll electrode to the said cavity. During welding of a reinforcing framework the roll electrode is supplied by impulses synchronized with the time of mutual crossing of the elements of the longitudinal and transverse reinforcement as well as with the time of feeding a current pulse to the roll electrode. The said roll electrode is used as the means for forming a coil when making a framework, which roll ensures constant pressing of the elements of transverse reinforcement to the elements of longitudinal reinforcement by a force applied by a hydraulic actuator.

It should be noted that for extrusion molding of a metal-polymeric pipe a heat-resistant non-metal bush is arranged before the mandrel. The inner and the external surfaces of a pipe molded are cooled, in order to produce a polymer matrix with a molecular structure on the basis of an amorphous phase, which matrix contains the amorphous phase in an amount from 60% to 90% of the polymer total volume.

A cooling agent in the form of a mist produced from compressed air and a cooling liquid is used for cooling of a molded metal-polymeric pipe externally. Furthermore, a cooling liquid is fed into the inner cavity of a molded metal-polymeric pipe for cooling it internally, which liquid fills the space between the mandrel and a plug arranged within the said pipe.

In order to produce a metal-polymeric pipe continuously, a device is developed that comprises an extruder with an extrusion head having a passage for introducing a polymer melt into mold cavity formed by a cooled mandrel and an external mold barrel. The claimed device also comprises a welding machine fixed to the extrusion head, clasping the extrusion head along its external circumference and coupled with reels for elements of longitudinal and transverse reinforcement as well as with guiding means for feeding reinforcement into the welding area and with means for feeding a welded reinforcing framework into the mold cavity. Furthermore, the claimed device comprises a cooling system, a pulling mechanism and a cutting device, which are arranged in succession in the movement direction of a metal-polymeric pipe molded. The mandrel is secured to the extrusion head via a distributor and a heat-resistant non-metal bush, which are installed in succession. The welding machine of the claimed device comprises at least one roll electrode connected to a pressing device and a shock mechanism, which are connected to the hydraulic actuator for the purpose of transferring a pressing force and shock pulses from the hydraulic actuator to the roll electrode during welding of the elements of the longitudinal and transverse reinforcement, as well as means for synchronizing shock pulses with the time of mutual crossing of the elements of the longitudinal and transverse reinforcement and with the time of feeding a current pulse to the roll electrode. The means for forming a coil from the transverse reinforcement elements is the said roll electrode, which roll is arranged with the possibility of rotating around its axis and around the axis of a reinforcing framework as well as with the possibility of pressing the transverse reinforcement elements to the longitudinal reinforcement elements under a force provided by the hydraulic actuator. The cooling system is made with the possibility of producing the pipe polymer matrix with a molecular structure on the basis of an amorphous phase, for which purpose it additionally includes a cooling agent generator located outside the molding barrel as well as a plug with a valve, the plug being arranged within a metal-polymeric pipe molded for the purpose of creating a closed cavity therein. The plug of the cooling system may be connected via a flexible connection to one end of a tube supplying a cooling liquid. The cooling agent generator, which is used in the cooling system of the claimed device, is made as a perforated tube located at the external side of a pipe molded, holes in the perforated tube of the cooling agent generator facing a pipe molded. In particular, the cooling agent generator may be made as a perforated spiral tube clasping a metal-polymeric pipe along the external circumference.

The welding machine of the claimed device comprises a carousel for arranging at least one roll electrode and a drum clasping the extrusion head body; they are arranged with the possibility of rotating around the longitudinal axis of the head and are provided with an actuator. The shock mechanism, as connected to the roll electrode, comprises a hydraulic cylinder connected to the hydraulic actuator; and the pressing device is made as a spring arranged on the hydraulic cylinder rod and supported by the roll electrode lever. Furthermore, the welding machine drum is provided with rotatable reels with transverse reinforcement elements winded on them, the reels having the possibility of rotating around the drum axis.

The cooled mandrel of the claimed device is arranged with the possibility of being positioned on the extrusion head according to the bore diameter, which is very important for ensuring dimensional stability of a pipe produced, and, consequently, for its quality.

The welding machine of the claimed device may be provided with, as a means for synchronizing shock pulses and welding current pulses, position sensors connected to a counting device. According to another embodiment, the welding machine may be provided with, as a means for synchronizing shock pulses and welding current pulses, feedback sensors connected to a processor for the purpose of automatically determining optimal current parameters.

A molded pipe in the production process is continuously translated along the longitudinal axis of the claimed device under the action of the pulling mechanism. Further, a cutting device is arranged downstream the pulling mechanism with the possibility of moving at a speed corresponding to a movement speed of a metal-polymeric pipe molded. A gravity roll carrier, which is provided with a system for collecting a cooling liquid and returning it to the cooling system, is arranged downstream the cutting device, in succession in the movement direction of a metal-polymeric pipe molded.

Pipes, which may be produced according to the above-described method, are intended, primarily, for construction of pipelines operated in extreme conditions in respect of corrosive load and at a high pressure of a transported fluid.

The claimed pipeline is made of metal-polymeric reinforced pipes with a welded metal framework and a polymer matrix having a molecular structure on the basis of an amorphous phase. The said pipes are produced by the extrusion molding method. Pipes are connected in the pipeline with the use of connecting elements arranged on thread at the ends of the metal-polymeric reinforced pipes. Each connecting element is made as a polymer bush of cylindrical shape with thread on its internal surface and with an annular inner collar at the end face, which collar covers visible portions of metal reinforcement at the end face of a metal-polymeric pipe, the tooth height of the threaded connection being less than the thickness of the polymer external layer covering the reinforcing framework in the wall of a metal-polymeric pipe.

The pipeline may comprise either detachable or welded connections of metal-polymeric reinforced pipes, or it may comprise a combination of permanent and detachable connections, in accordance with the technological purposes of operating it.

Two or more metal-polymeric reinforced pipes in the claimed pipeline are connected with the use of connecting elements mounted onto the pipe ends. In order to produce a welded connection, pipes should be arranged butt-to-butt with their end faces of the connecting elements to ensure the possibility of simultaneously heating these end faces with a heater arranged between them and subsequently removing the heater; then a welded connection is achieved by pressing the pipes by way of translational movement in the opposite direction.

In particular, in order to produce the said welded connection of metal-polymeric reinforced pipes, a flat electric heater of "iron" type may be used, which is arranged between the end faces of connecting elements.

Additional flange connections may be used for strengthening welded connection of the pipeline. For this purpose the external wall of connecting elements is provided with a chamfered groove for accommodating ring-shaped flanges with holes arranged circumferentially, and the inner annular surface of the flanges is provided with a complementary conical surface having a cone angle corresponding to the angle of the chamfer made at a connecting element. Pipes, which are provided with flanges, are connected by tying them with the use of studs or bolts and nuts.

According to another embodiment, the pipeline may comprise sleeves for strengthening welded connections. Sleeve couplings can be made as follows. First, connecting elements are arranged on the ends of metal-polymeric reinforced pipes, as described above, which elements are welded to each other at their end faces; then, thread is made at the external surface of bushes of the said connecting elements. A length of a metal-polymeric pipe may be used as a sleeve coupling, which diameter is greater than that of pipes to be connected, and complementary thread should be made on the internal surface of a sleeve, which corresponds to thread on the external surface of bushes. This enables to make threaded sleeve strengthening of a welded connection of metal-polymeric reinforced pipes.

According to another embodiment, the pipeline may comprise a detachable flange connection of at least two metal-polymeric reinforced pipes, which may be produced with the use of threaded connecting elements mounted onto the pipe ends; annular slots are made at the ends of the connecting elements, wherein seals are accommodated; grooves are made and flanges are arranged on the external wall of the connecting elements; pipes to be connected are arranged butt-to-butt with face ends of the connecting elements with the possibility of tying the flanges with studs or bolts and nuts.

According to still another embodiment, the pipeline may comprise a detachable sleeve connection of at least two metal-polymeric reinforced pipes, which may be produced with the use of threaded connecting elements mounted onto the pipe ends. Thread for a sleeve should be additionally made on the external surface of the connecting element sleeves, and a length of a metal-polymeric pipe may be used as a sleeve coupling, which diameter is greater than that of pipes to be connected. Complementary thread should be made at two ends on the internal surface of a sleeve, which enables to screw the sleeve on the connecting element bushes. A sleeve made as a length of a metal-polymeric pipe is further provided with protective polymeric rings covering reinforcement on the sleeve end faces.

When making a sleeve connection for the pipeline, the external surface of the connecting element bushes may be provided, e.g., with cylindrical thread. In such a case the pipeline comprises in this connection a sealing ring arranged between the end faces of the connecting elements.

According to another embodiment, the external surface of the connecting element sleeves may be provided with tapered self-sealing thread. In this case it is not required to place a sealing ring between the connecting element end faces.

The claimed pipeline may comprise a transition from metal-polymeric pipes to metal pipes. For this purpose the pipeline may comprise, for example, a detachable connection for a metal pipe and a metal-polymeric pipe with the use of a polymeric connecting element arranged at the end of the metal-polymeric pipe on thread. The external surface of the connecting element sleeve has a tapered chamfer intended for the mounting surface of an additional metal sleeve clasping the said connecting element on the outside; the external surface of the additional metal sleeve is provided with thread, and complementary thread is made on an adapter barrel into which a metal pipe to be connected to the pipeline is inserted and secured, e.g., by welding.

The claimed pipeline may comprise a connection for a metal-polymeric pipe with threaded connecting element arranged on the pipe end and a pipe made of a glass-reinforced plastic, and/or a pipe made of a polymer reinforced with a metal foil, and/or a pipe made of a polymer reinforced with a metal band, and/or a pipe made of non-reinforced polymer.

According to any of the above-described embodiments of the pipeline structure, a polymeric connecting element having a universal structure is used for connecting metal-polymeric reinforced pipes; it is made as a cylindrical sleeve with an annular collar at the end. Also, the inner side surface of the sleeve is provided with thread, and the width of the annular collar does not exceed the thickness of the side wall of a metal-polymeric pipe to be connected, but is made so as to be greater than the depth at which reinforcing elements are arranged in the wall of such a pipe. The claimed connecting element is made of the same polymeric material as a metal-polymeric reinforced pipe to be connected. The inner diameter of the connecting element sleeve is smaller than the outer diameter of a metal-polymeric pipe by the thread tooth height. It should be also noted that the tooth height of thread made on the connecting element is always smaller than the thickness of the polymer layer over reinforcing elements in the wall of a metal-polymeric pipe.

The claimed metal-polymeric reinforced pipe and pipelines constructed with the use of it may find wide application while constructing various objects, such as:
high-pressure water supply lines;
pipelines of pressurized sewers;
hot-water supply pipelines (lines);
pipelines for oil and gas production sites;
pipelines for transportation of well fluids;
pipelines for construction of artesian wells as well as for preparing casing columns;
pipelines for transportation of oil products;
pipelines for transportation of gas with the possibility of forming gas supply networks for pressure of 40-90 atm, depending on pipeline diameter;
pipelines for transportation of acids, alkalis and fluids with high content of salts in the chemical industry;
pipelines for supplying solutions for underground and heap leaching of non-ferrous and rare-earth metals, as well as other pipelines for hydrometallurgy;
pipelines for metallurgical enterprises using sulfuric acid and other acids as well as those having waste waters with high content of salts;
pipelines for use in the mining industry, in particular for hydraulic transportation of pulps;
pipelines for pneumatic transportation of cement and other abrasive materials;
load-bearing structures for sea infrastructure, in particular for construction of platforms for oil and gas production;
pipelines for transportation of sea water to be desalinated;
pipelines to be laid in the marine environment;
supports and piles for construction of various facilities;
load-bearing structures for coast-protecting structures, in particular, those used for construction of ports and piers;

Construction of any of the above-mentioned pipelines requires both production of metal-polymeric pipes of high strength and production of reliable structures for connecting metal-polymeric reinforced pipes.

BRIEF DESCRIPTION OF THE DRAWINGS

The invention is illustrated in FIGS. 1-13.

DETAILED DESCRIPTION OF THE DRAWINGS

Figure 1A:
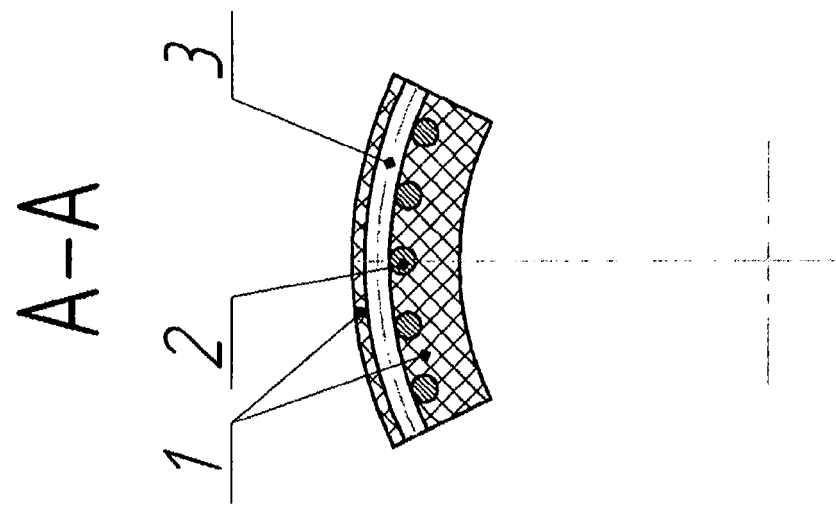
FIG. 1A shows the structure of the claimed metal-polymeric pipe in a cross-sectional view along A-A line.
Figure 1:
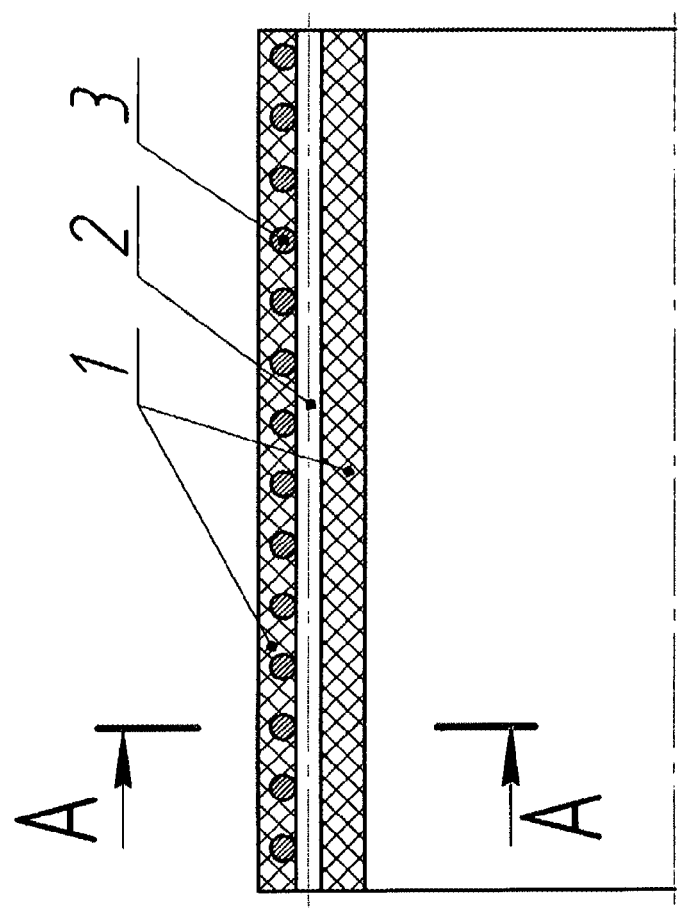
FIG. 1 shows the structure of the claimed metal-polymeric pipe in a longitudinal sectional view.

A metal-polymeric reinforced pipe, as shown in FIG. 1, has a polymer matrix 1 and a welded metal framework made of longitudinal reinforcement elements 2 and transverse reinforcement elements 3. The framework is produced by spirally winding transverse reinforcement elements 3 onto longitudinal reinforcement elements 2 and their welding to each other in each point of their crossing. The metal-polymeric reinforced pipe is produced by extrusion molding during which a welded reinforcing framework is fed to a mold cavity, while simultaneously feeding a polymer melt to the cavity, and after a molded pipe leaves the mold cavity, it is subjected to intensive double-side cooling wherein a cooling agent is fed both on the inside and outside.

Figure 2:
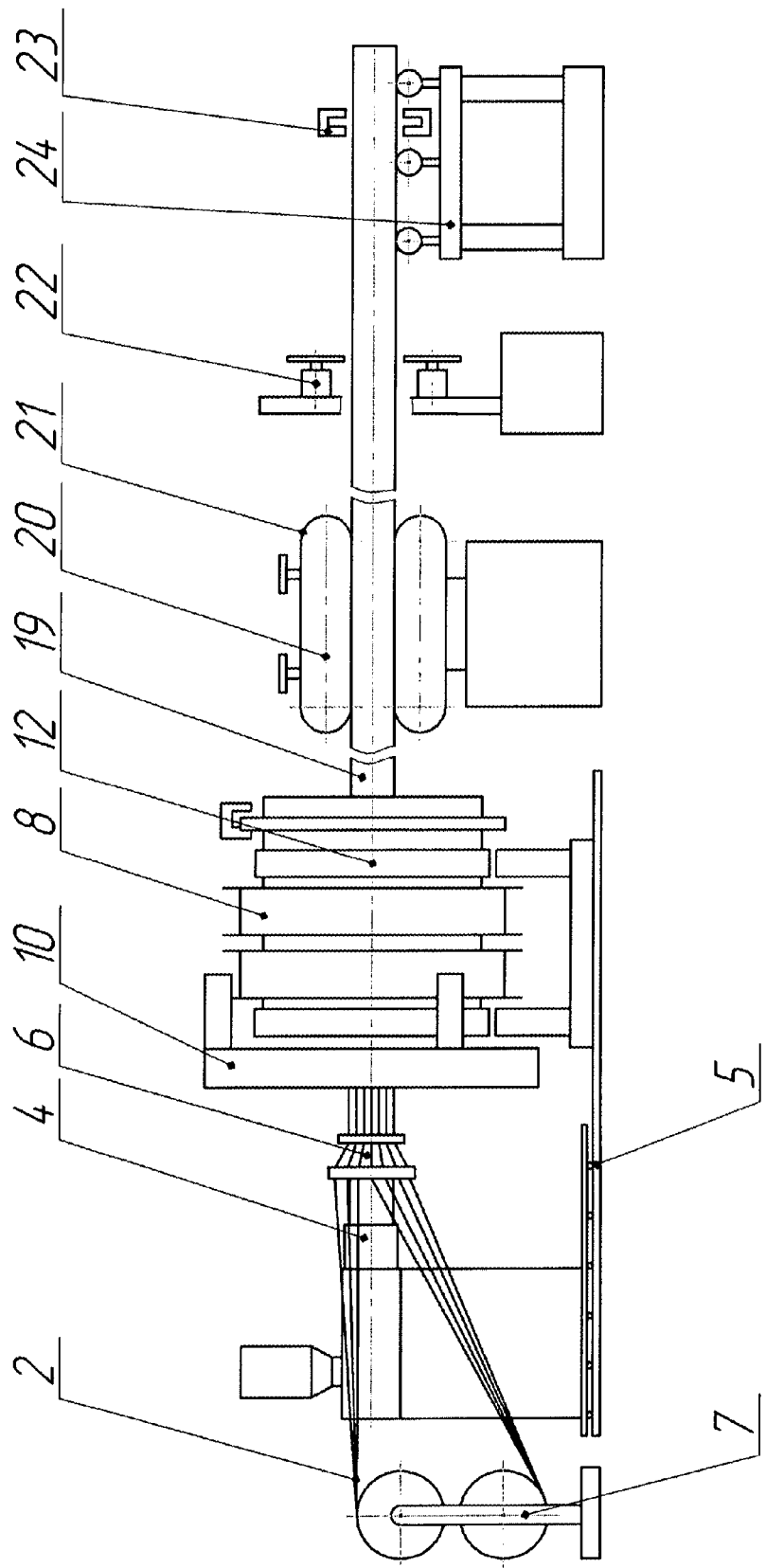
FIG. 2 shows a general schematic view of the device for continuously making a metal-polymeric pipe.
Figure 3:
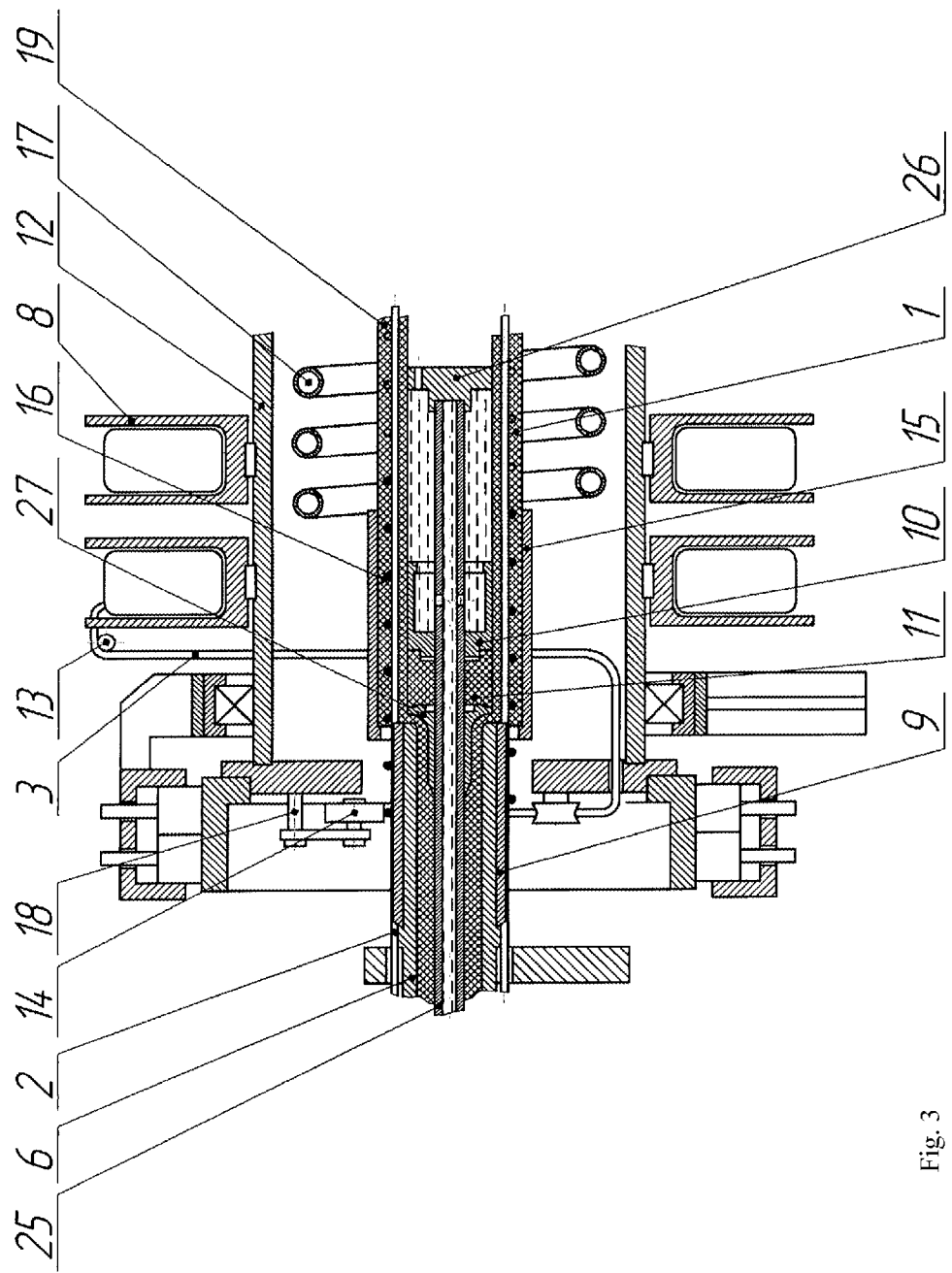
FIG. 3 shows a schematic view of a section of the extrusion head with the welding machine arranged thereon.

The device for continuously producing a metal-polymeric pipe, as shown in FIGS. 2 and 3, comprises an extruder 4 mounted on a base 5 and provided with an extrusion head 6. Reels 7 and 8 are used, respectively, for feeding longitudinal and transverse metal reinforcement (in particular, wire). A jig 9 with slots along which the longitudinal reinforcement elements 2 are moved, is mounted onto the extrusion head 6 (FIG. 3). A mandrel 10, which is continuously cooled by a liquid on the inside, is secured to the extrusion head 6 via a heat-resistant bush 11. The housing (not shown in the Figure) of the welding machine is provided with a drum 12 having an individual rotary actuator (not shown in the Figure) on which the reels (bobbins) 8 for the transverse reinforcement elements 3, a guiding mechanism 13, a roll electrode 14 for welding the transverse reinforcement elements 3 to the longitudinal reinforcement elements 2 are arranged with the possibility of rotating freely. The drum 12 accommodates a stationary barrel 15 forming together with the mandrel 10 an annular mold cavity 16 for molding a polymer exiting the extruder. The cooling agent generator 17 is rigidly arranged on the outside of the mold barrel 15. A welding unit consisting of one or more roll electrodes 14 connected to power sources (not shown in Figures), an eccentric lever 18 and the actuator are arranged on the drum 12. For the purpose of continuously feeding the longitudinal reinforcement elements 2, as unwound from the reels 7, and outputting an extrudate from the extrusion head 6 a pulling mechanism 20 with adjusted force of tracks 21 is arranged after the head 6 in the direction of moving a molded metal-polymeric pipe 19.

For the purpose of making pipes having a certain length a cutting device 22 is provided. A signal for starting the cutting process is supplied by a position sensor 23 arranged on a gravity roll carrier 24. The gravity roll carrier 24 has several guiding rolls and serves as the support for finished products; its structure also provides a system for collecting a cooling liquid and returning it to the cooling system.

An extrudate, that is a melt of an extruded polymer, which exits the extrusion head 6, falls onto a continuously moving metal framework welded from elements of longitudinal reinforcement 2 and transverse reinforcement 3. The process of filling the framework with the extrudate is performed in the mold cavity 16 restricted along its internal surface by the mandrel 10 and the sleeve 11 arranged before it and the mold barrel 15 along its external surface.

In order to produce the pipe internal surface of required quality (geometrical arrangement—coaxiality of the inner circumference, the external circumference and the framework; surface roughness) the mandrel external surface is polished, and the mandrel structure has the possibility of being positioned on the extrusion head due to an increased bore diameter.

The longitudinal reinforcement elements 2 are tensioned and moved by the pulling device 20. The geometrical arrangement of the longitudinal reinforcement elements 2 relative to the pipe body is determined by slots disposed concentrically on the jig 9. The outer coil of the reinforcing framework is formed by simultaneous movement of the drum 12 feeding the transverse reinforcement 3 and translational movement of the longitudinal reinforcement 2. A coil of the transverse reinforcement 3 has a definite pitch, in accordance with the method, in the range of s-6 s (where s is the transverse dimension of the outer reinforcement) and is welded to corresponding, in succession crossed longitudinal reinforcement elements 2 by the roll electrode 14. The profile of the longitudinal reinforcement and the transverse reinforcement may have any section and is selected according to set properties of a pipe to be molded. The transverse reinforcement 3 is unwound from the reels 8 arranged on the housing of the drum 12, which reels rotate freely on bearings, and is fed to welding rolls 14 via a system of the guides 13. The hydraulic actuator and hydraulic control valves together with the eccentric lever 18 perform the function of pressing the roll electrode 14 to the transverse reinforcement coil. The welding roll 14 is pressed and a welding current pulse is fed simultaneously for contact welding, the time of feeding welding current pulses from transformers to the roll electrode being installed in several ways, for example:

a) mechanically, with the use of a counting device and position sensors;

b) automatically, on the basis of determination and coordination of: pulling speed of a pipe molded, rotational speed of the drum, voltage and strength of current supplied to the roll electrode 14. Feedback sensors are used for determination of most effective current parameters that are set earlier, on the basis of tests. In order to synchronize shock pulses and welding current pulses, the welding machine is provided with feedback sensors connected to a processor for the purpose of automatically determining optimal current parameters.

In order to achieve an optimal structure of the polymer matrix (based on the amorphous phase), during production of a metal-polymeric pipe it is necessary to ensure continuous cooling of the extrudate after it exits the mold cavity 16. In order to cool the internal surface of a molded metal-polymeric pipe 19, a system for feeding a cooling agent to the mandrel 10, which is used for calibration of the inner diameter of a pipe produced, is provided. A cooling agent is fed through a tube 25 passing within the extrusion head 6. As the cavity within a molded metal-polymeric pipe 19 is filled, pressure is created there which is maintained by a bleeder valve arranged in a plug 26 installed within the pipe. For cooling on the outside the cooling agent generator 17 is used that supplies a cooling agent consisting of a pressurized gas and a cooling liquid onto the external surface of a molded metal-polymeric pipe 19. When a polymer melt fills the annular mold cavity 16 restricted by the mold barrel 15 on the outside, a cooling agent, which is sprayed from holes located on the inner side of the coil of the generator 17, is supplied directly from the outside onto the molded metal-polymeric pipe 19.

If polymers that do not relate to the polyolefin group are used for molding a pipe, it is possible to use a cooling mixture including a cooling liquid and a pressurized gas with a temperature of a produced cooling agent below 0° C.

After exiting the welding machine, a molded metal-polymeric pipe 19 passes through the pulling device 20, a pressure of the tracks 21 of which, for the purpose of avoiding defects in the pipe geometry or insufficient force of the said pressure, is adjusted manually or automatically. Then the pipe 19 is fed to the gravity roll carrier 24 and, while moving on rollers, reaches the position sensors 23 which locations on the gravity roll carrier is determined by a pipe required length. The sensors 23 feed a signal to the cutting device 22 which, while moving simultaneously with the pipe along the guides, cuts the finished metal-polymeric pipe. All the production process is continuous and cyclic.

The melting temperature of polymers, which are most frequently used for continuous production of a metal-polymeric pipe, is in the range from 130° C. to 280° C. In order to mold a polymer, it is necessary to heat it above its melting temperature. Reinforced metal-polymeric pipes have increased long-term strength and, at the same time, maintain their flexibility in the system "metal framework-polymer".

According to the state of the art, slow cooling of a pipe after a polymer leaves the extrusion head contributes to the process of the polymer matrix crystallization which results in that the polymer structure of the pipe taken as the prototype consists of crystallites by 70-90% and is characterized by low flexibility and plasticity.

Quick and deep cooling, which is used in production of the claimed pipe, enables to achieve a polymer structure consisting not more than by 10-30 Vol. % of fine-grain crystallites and by 70-90 Vol. % of amorphous zones. In a long time the crystallite factor in the polymer structure will become slightly higher due to an increase in the crystallite sizes, but this will not entail significant changes in the properties of a pipe produced, since the diffusion processes are very slow in solid polymers. The achieved macromolecular structure of a finished pipe has sufficient flexibility, since a main volume is occupied by amorphous zones that are plastic under action of loads; they deform, but not disintegrate.

Figure 6:
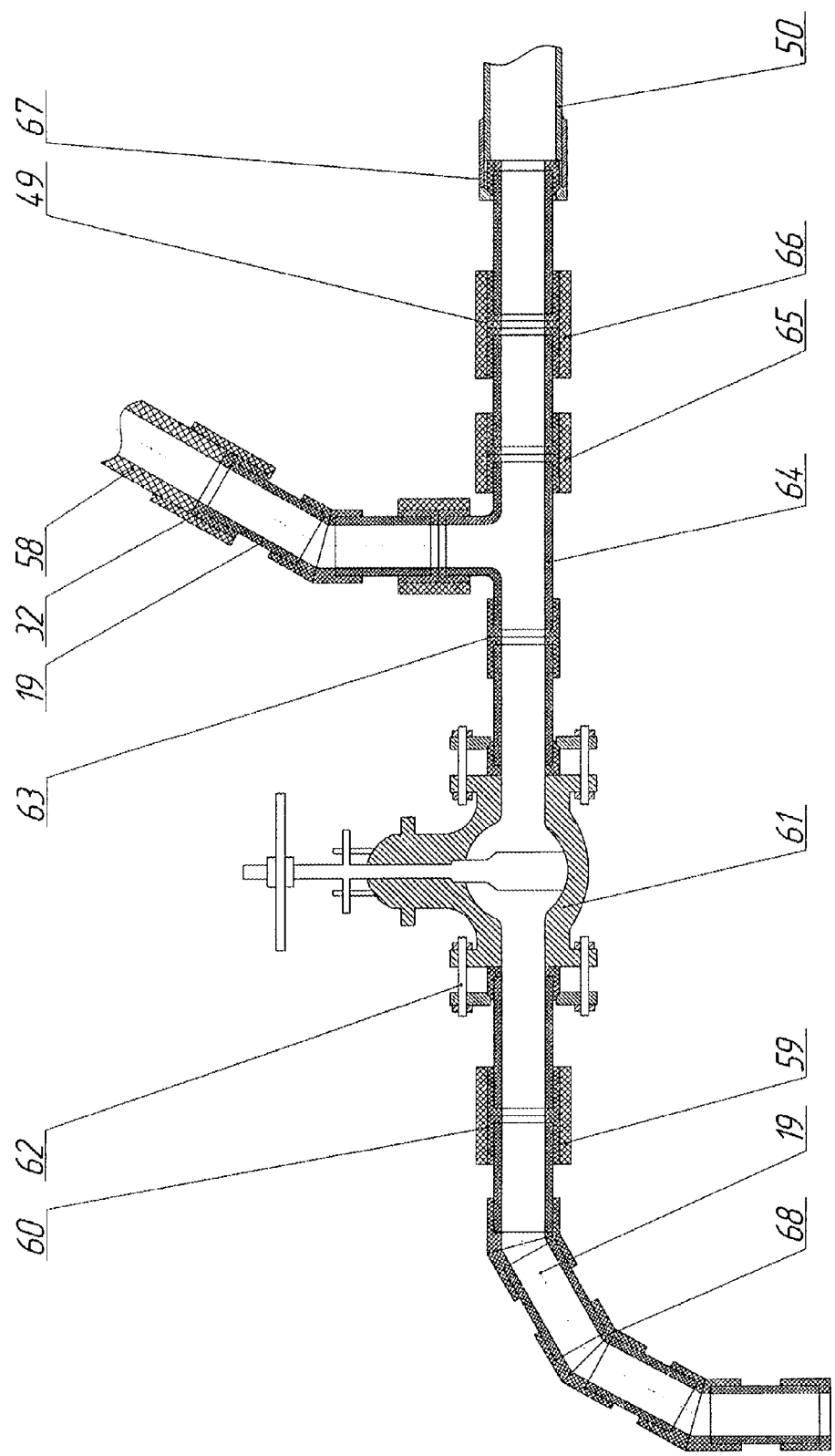
FIG. 6 shows a schematic view of a pipeline constructed of the claimed metal-polymeric reinforced pipes.

Production of a metal-polymeric pipe of high quality and strength opens prospective fields of its application both in pipeline transport and for creation of strong, relatively light load-bearing structures having perfect corrosion resistance. However, in order to use the claimed metal-polymeric reinforced pipes in pipeline structures, e.g. as shown in FIG. 6, and in other structures, it is necessary to develop reliable means for connecting metal-polymeric reinforced pipes therebetween.

Figure 7B:
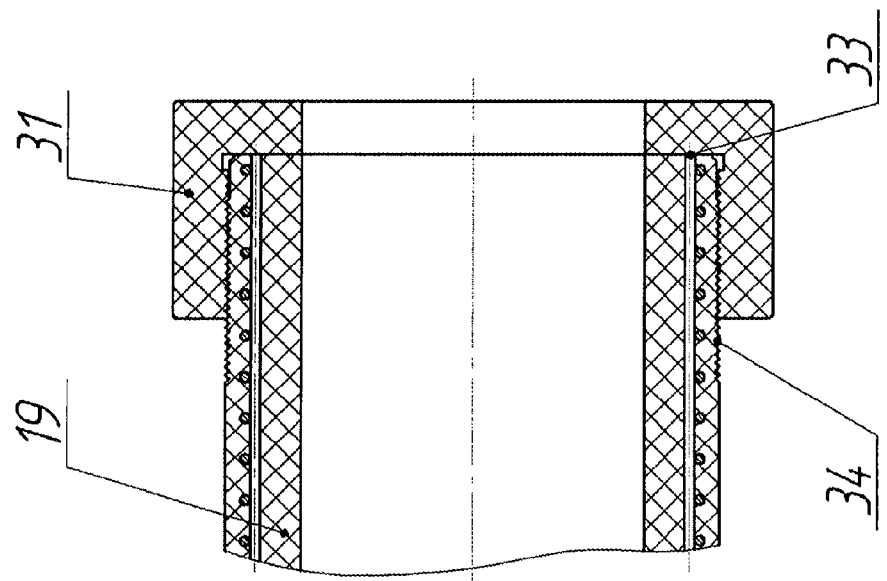
FIGS. 7A and 7B show schematic views of the connecting element and its arrangement on one end of a metal-polymeric pipe.

FIG. 7B shows that for connecting metal-polymeric reinforced pipes to construct a pipeline, it is first necessary to provide the ends of each pipe 19 with so-called end pieces, i.e. connecting elements 32 made as a sleeve produced from the same polymeric material as the pipe itself. The sleeve of the connecting element 32 covers a definite length from the end of the pipe 19 as well as covers visible portions of the metal reinforcement 33, thus precluding appearance of corrosion on open elements of the metal reinforcement. The connecting element 32 corresponding to the claimed invention may be made by making blanks in injection molding machines. Such a cast blank has certain allowances and technological elements that will be removed during subsequent machining, and a blank will have the finished appearance of a cylindrical sleeve with a collar along the inner circumference.

Figure 7A:
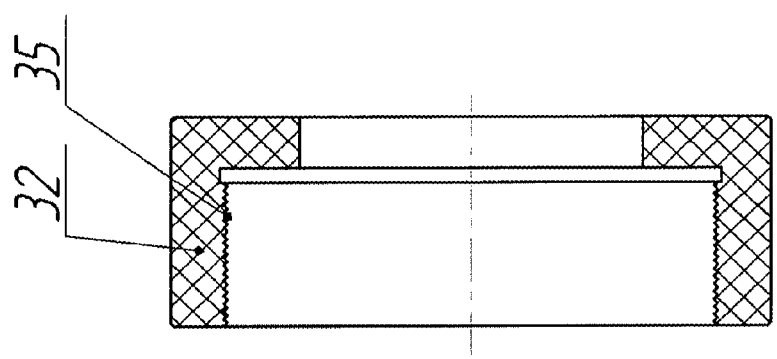

According to another embodiment, a blank for making the connecting element 32 may be produced by extrusion as a non-reinforced (single-component) polymeric pipe, then such a pipe is cut into portions, and thereafter a connecting element in the form of the end piece shown in FIG. 7A is made out of each portion by lathing.

The material used for producing the connecting element 32 is a welded polymer. Preferably, the same material is used as for production of connected metal-polymeric reinforced pipes; this helps to avoid problems with different coefficients of thermal expansion. However, in order to connect pipes made of different polymers, a material for the end piece may be selected with due regard to the optimal combination of materials used.

The connecting elements 32 are made non-reinforced; they should be rigidly fixed at the pipe ends, in order to ensure a reliable connection of the latter in a pipeline. For this purpose thread 34 is made on the upper polymer circumference, this thread having a pitch, tooth height and start angle that allow to avoid appearance of the reinforcing framework elements on the surface. A device for making thread may include a tapping die with handles and a guide, or, in a case of making this process mechanical, a unit with a drive for rotating and moving a tapping die and guides. After thread is made, the connecting element 32 is screwed onto the pipe 19, which, on its inner contact surface, already has thread with the parameters corresponding to those of the thread on the pipe. The process of repairing a pipeline with the claimed connecting elements may be performed in field conditions, since there is no necessity of dismounting a pipe to be repaired and no additional special equipment is required.

Figure 8:
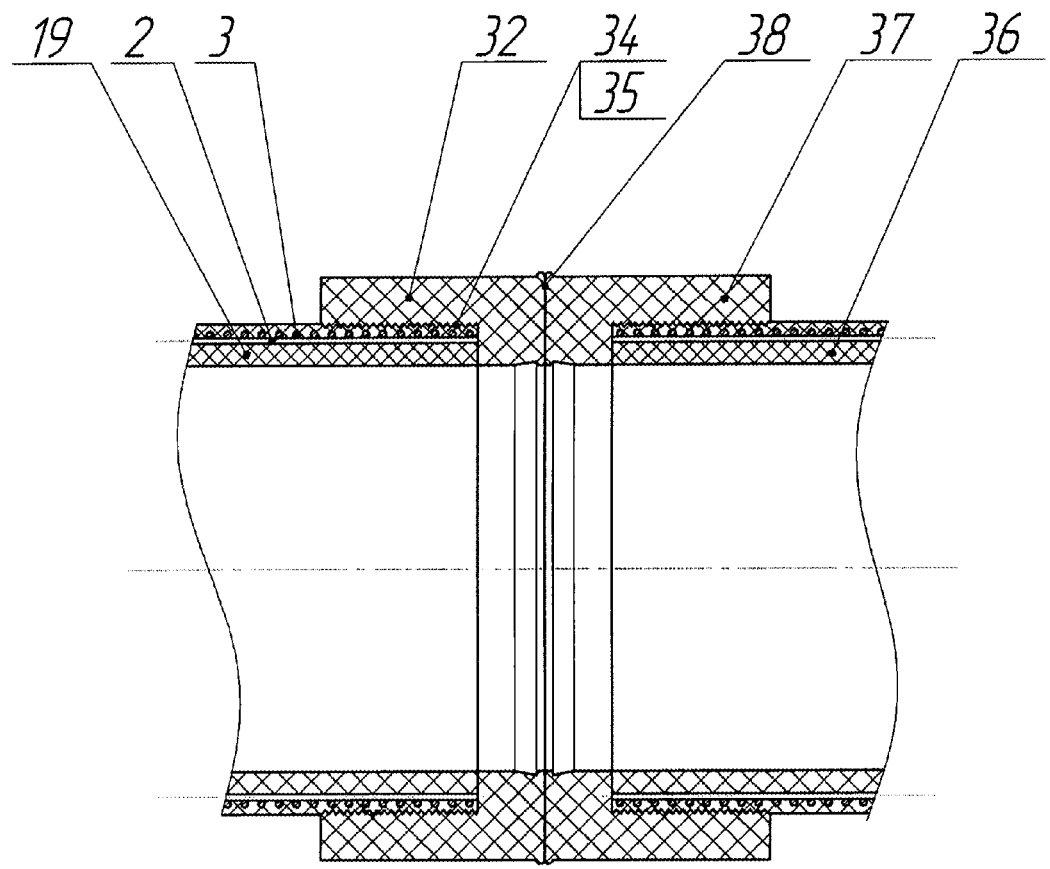
FIG. 8 shows a schematic view of a welded connection of metal-polymeric reinforced pipes in a pipeline.

FIG. 8 shows a welded connection of metal-polymeric reinforced pipes in a pipeline. A connection of two metal-polymeric reinforced pipes 19 and 36 in the claimed pipeline may be made with the use of the connecting elements 32 and 37, respectively, at the ends of such pipes. In order to make a welded connection, pipes should be arranged butt-to-butt by the end faces of the connecting elements 32 and 37 with the possibility of heating the end faces with a flat heater of "iron" type arranged therebetween. After removing the heater, the welded connection 38 is achieved by pressing the pipes by way of translational movement in the opposite direction.

Figure 9:
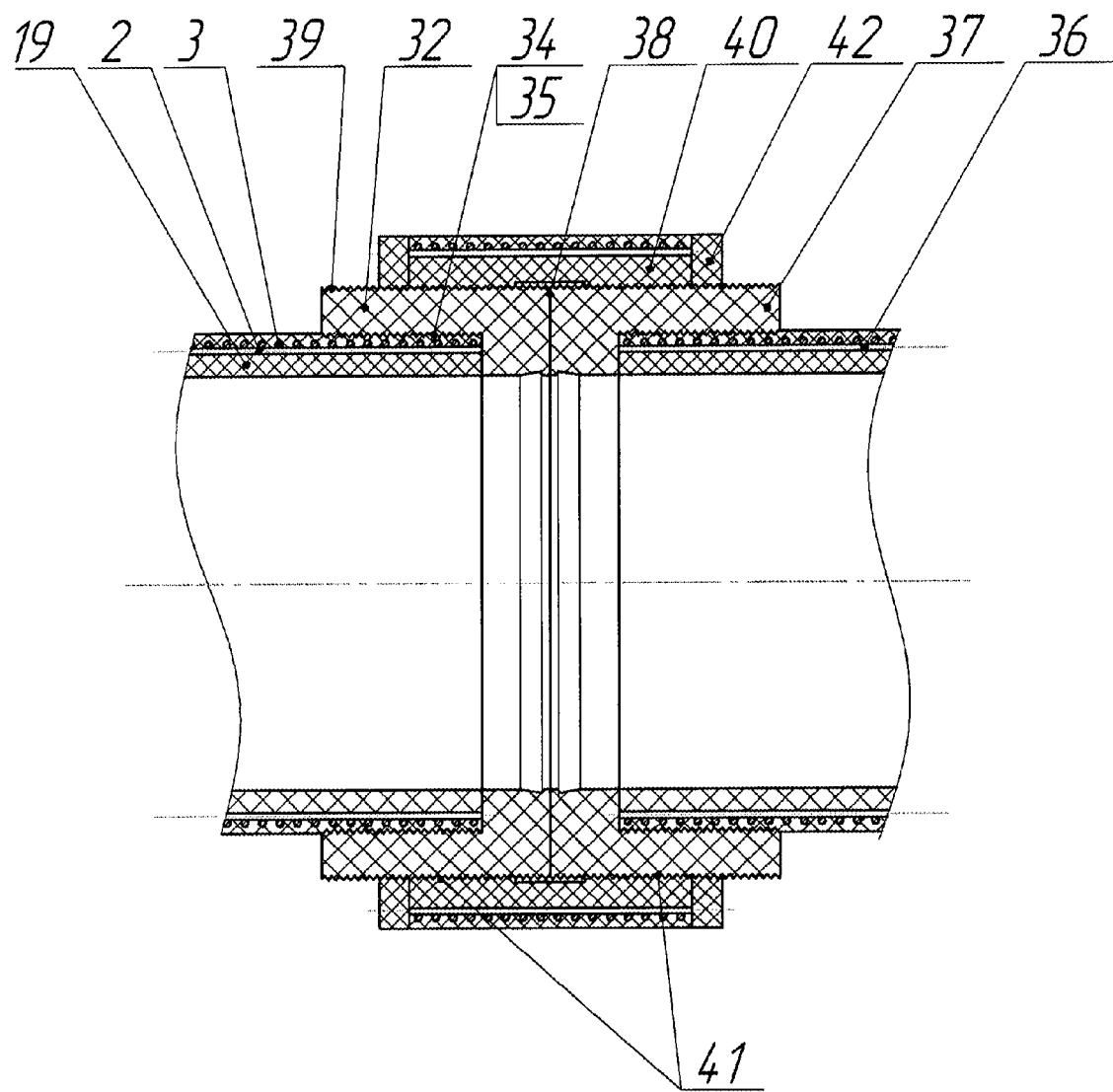
FIG. 9 shows a schematic view of a welded connection of metal-polymeric reinforced pipes in a pipeline, the connection being reinforced with reinforced metal-polymeric sleeve.

FIG. 9 shows a welded connection of metal-polymeric reinforced pipes in a pipeline, which is strengthened with a reinforced metal-polymeric sleeve. In order to make this connection, the connecting elements 32 and 37 are mounted onto the end faces of the metal-polymeric reinforced pipes 19 and 36 in the way described above, which connecting elements 32 and 37 are welded to each other along their end surfaces, thus obtaining a weld 38, then thread 39 is made on the external surface of the sleeves of the connecting elements 32 and 37. A metal-polymeric pipe length having a diameter that is greater than that of the pipes is used as a connecting sleeve 40, and the internal surface of the sleeve on its two sides is provided with complementary thread corresponding to the thread 39 on the external surface of the sleeves 32 and 37. Then the sleeve 40 is screwed, with the use of its thread 39-41, onto the connecting elements 32-37 welded therebetween for achieving threaded sleeve strengthening of the welded connection of the metal-polymeric reinforced pipes. For the purpose of protection against corrosion polymeric rings 42 are arranged on the end faces of the sleeve 40, which cover metal reinforcement portions visible on the faces.

Figure 10:
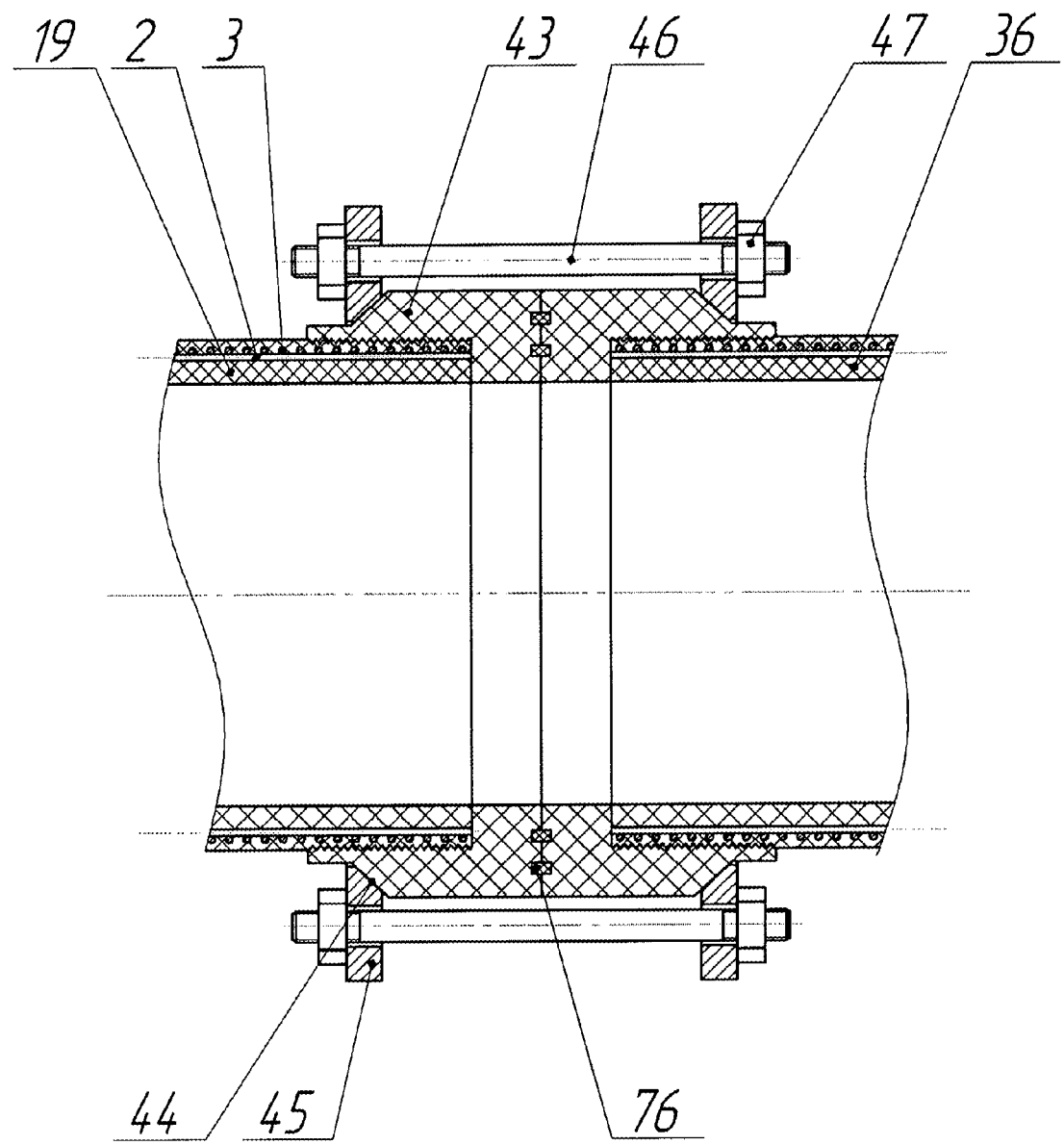
FIG. 10 shows a schematic view of a detachable flange connection of metal-polymeric reinforced pipes.

FIG. 10 shows a detachable flange connection of metal-polymeric reinforced pipes, which is used for strengthening welded connections in a pipeline. For this purpose the external wall of the connecting elements 43 is provided with a groove with a chamfer 44 for arranging flanges 45 having the shape of a ring with holes arranged circumferentially, and the inner annular surface of the flanges is provided with a complementary conical surface having a cone angle corresponding to the angle of the chamfer 44 made at the respective connecting element 43. The pipes 19, 36 are connected by tying the flanges 45 with the use of studs 46 and nuts 47.

Figure 11:
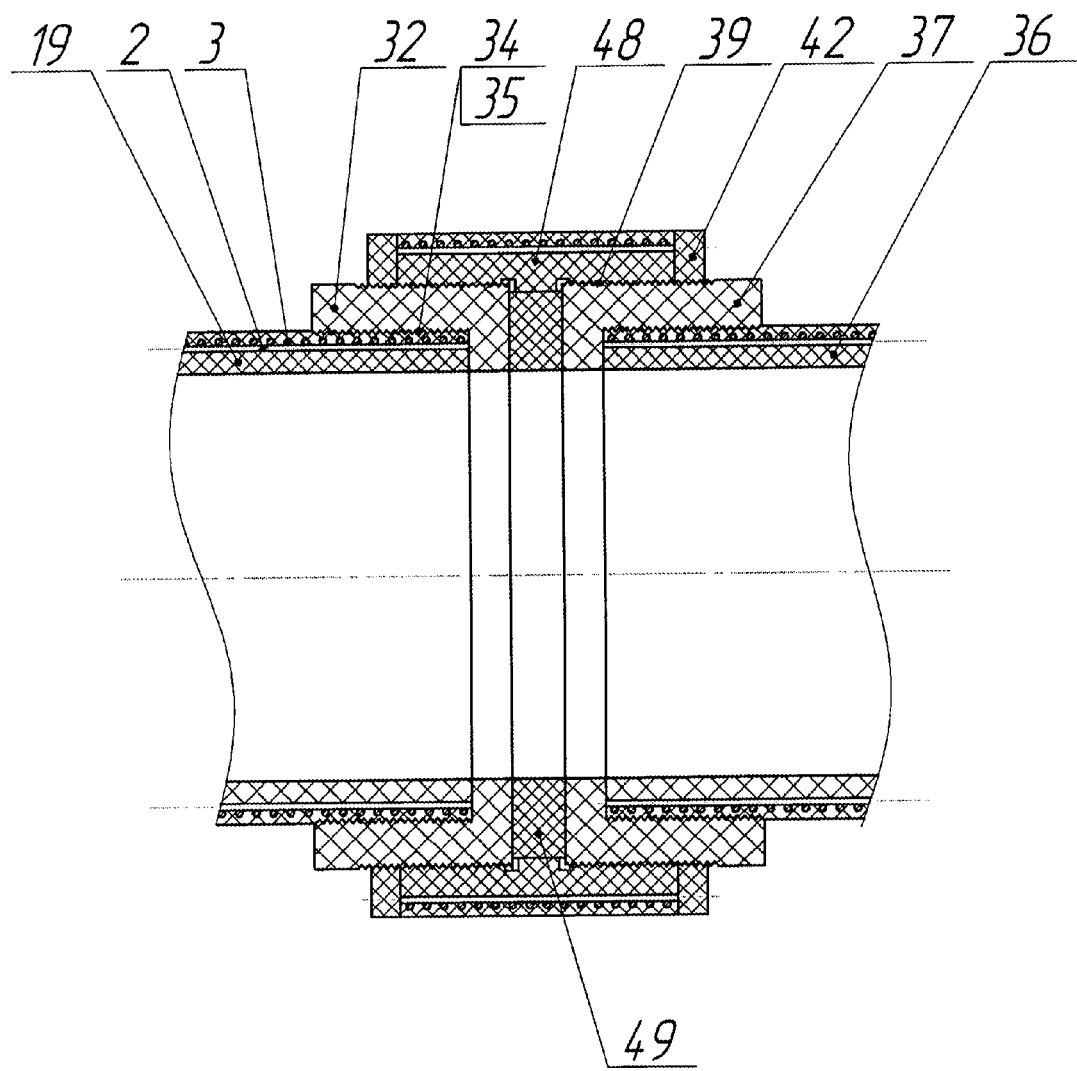
FIG. 11 shows a schematic view of a detachable sleeve connection of metal-polymeric reinforced pipes.

FIG. 11 shows a detachable sleeve connection of the metal-polymeric reinforced pipes 19 and 36, which is achieved with the use of the connecting elements 32 and 37 mounted onto the ends of these pipes. The external surface of the sleeves of these connecting elements is additionally provided with thread 39 for a sleeve. A length of a metal-polymeric pipe with a diameter greater than that of the pipes to be connected may be used as a sleeve 48. For this, the internal surface of the sleeve 48 should be provided with complementary thread on two sides, which will enable to screw the sleeve 48 onto the sleeves of the connecting elements 32 and 37. The sleeve 48 is additionally provided with the protective polymeric rings 42 covering reinforcement on the ends.

When making a sleeve connection in a pipeline, thread on the external surface of the sleeves of the connecting elements 32 and 37 may be, for example, cylindrical. In such a case, this connection in the pipeline comprises a sealing ring 49 which is arranged between the end faces of the connecting elements 32 and 37.

According to another embodiment, the external surface of the sleeves of the connecting elements 32 and 37 may be provided with conical self-sealing thread. In this case no sealing ring is required between the end faces of the connecting elements.

Figure 12:
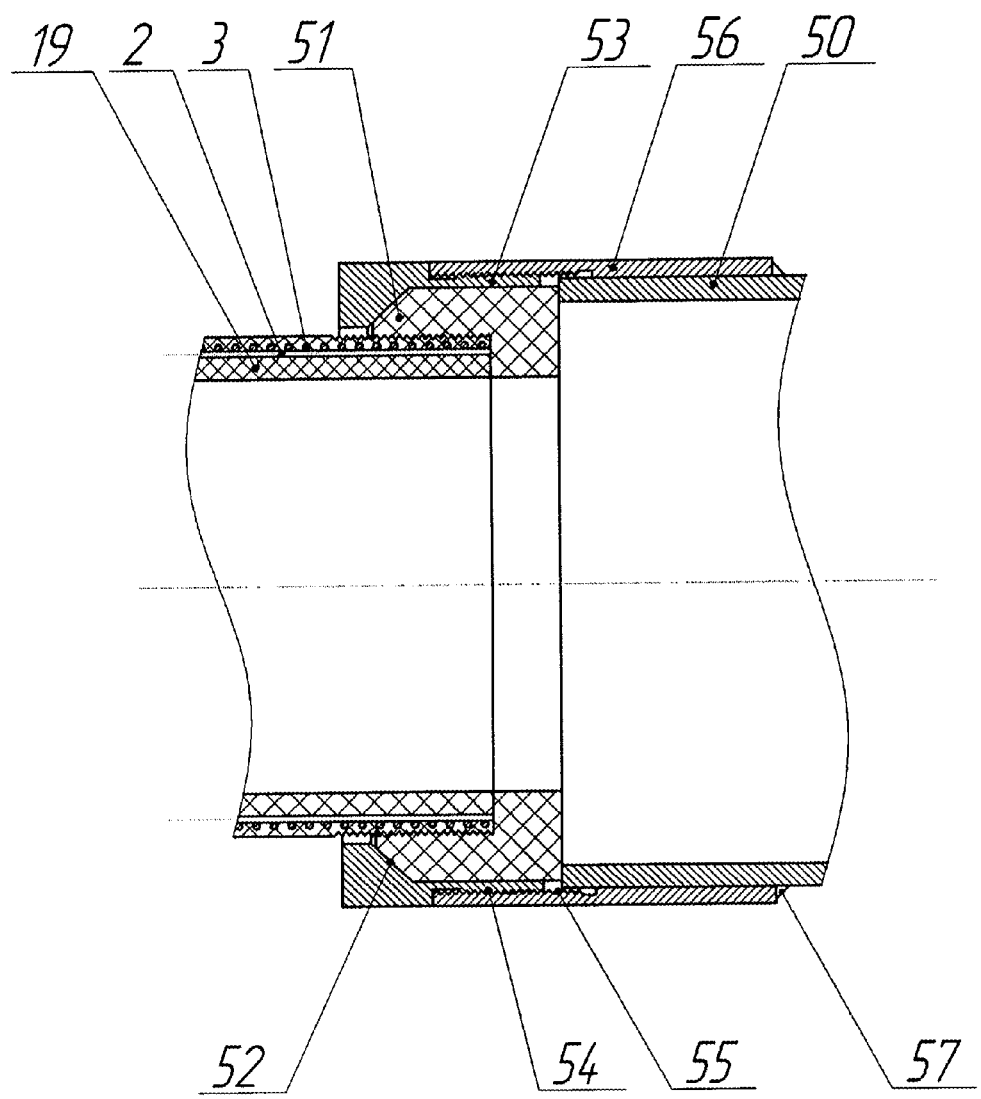
FIG. 12 shows a schematic view of a transition to a metal pipe.

FIG. 12 shows a transition from a metal-polymeric pipe 19 to a metal pipe 50, which transition may be used in the claimed pipeline if the latter is connected to a common pipeline of a city network.

A connection between the metal pipe 50 and the metal-polymeric pipe 19 is made with the use of a polymeric connecting element 51 arranged at the end of the metal-polymeric pipe 19 on thread. The external surface of the sleeve of the connecting element 51 has a conical chamfer 52 for the mounting surface of an additional metal sleeve 53 covering the connecting element 51 on the external side. The external surface of the additional metal sleeve 53 is provided with thread 54. Complementary thread 55 is made on a transitional barrel 56 into which the metal pipe 50 to be connected to the pipeline is inserted and secured, e.g., by welding 57.

The above-described connections of metal-polymeric reinforced pipes are shown in FIG. 6 within a length of the claimed pipeline, which length is made in one branch pipe with a transition to the metal pipe 50 and in another branch pipe with a transition to a polymeric non-reinforced pipe 58. The pipeline shown in FIG. 6 comprises a connection 59 made by butt welding of the connecting elements (as shown in FIG. 9), which connection is strengthened with a reinforced metal-polymeric sleeve arranged on the elements from above on conical self-sealing thread 60. Further, the pipeline comprises, as a stop valve, a wedge plug 61 mounted with the use of a flange connection 62. Further, a welded connection 63 is made that is shown in FIG. 8. Then, a branch is made with the use of a T-piece 64. Further, a sleeve connection 65 is shown that is made detachable with the use of cylindrical thread. Then, a detachable sleeve connection 66 is mounted that comprises the sealing ring 49 arranged as shown in FIG. 11. Further, a transition to the metal pipe 50 follows that is made as a detachable connection 67 shown in FIG. 12. In order to change the pipeline direction branch pipes 68 are used that are made as connecting elements according to various embodiments.

Figure 13A:
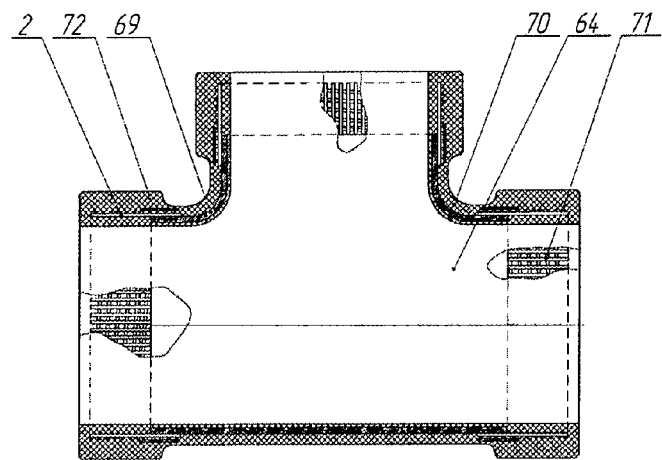
FIGS. 13A-13C show schematic views of embodiments of a T-piece and branch pipes for constructing the claimed pipeline.
Figure 13B:
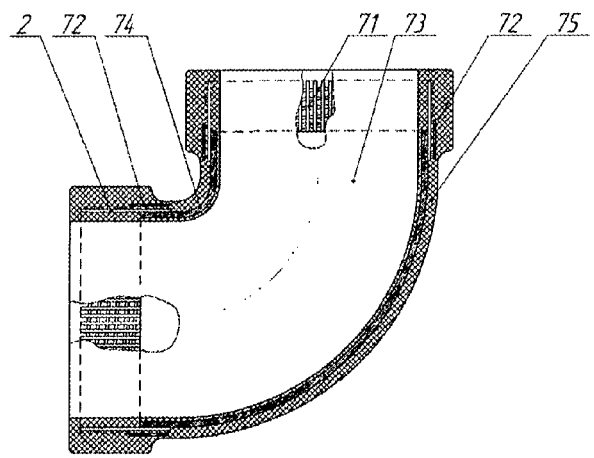
Figure 13C:
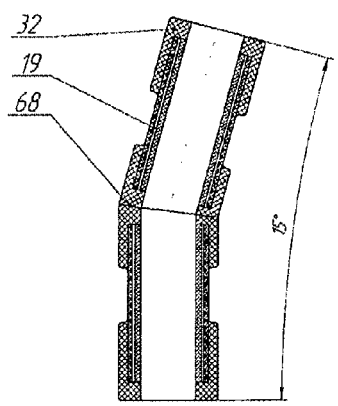

FIG. 13A shows one embodiment of a composite T-piece 64; and FIGS. 13B-13C show several embodiments of the branch pipes 68 for constructing the claimed pipeline.

When pipelines are built, there exists a necessity of solving process tasks, such as making network branches, connecting to the main pipeline, constructing a bypass pipeline and many others.

The present technical solution proposes a composite T-piece that is shown in FIG. 13A and intended for a pipeline made of metal-plastic reinforced pipes. The T-piece material is a composite of a metal and a polymer, and the T-piece comprises a metal T-piece 69 that is covered by a polymeric casing 70, that is, a metal T-piece is included into a polymeric T-piece. Short lengths of a metal framework 71 having a cylindrical shape are welded to three ports of the metal T-piece 69. For the purpose of making a composite T-piece a metal (stamped, cast, welded, etc.) T-piece 69 is mounted into a welding jig. Lengths of a metal framework 71 are in succession welded to its three ports, which lengths correspond to the framework of the metal-polymeric pipe 19. Also, in order to strengthen a weld, in some cases it is possible to use metal shells that are welded over the metal framework 71.

After the metal centerpiece is made, it is placed in a mold where the polymeric body, i.e., casing 70, of the T-piece is molded. Then, the finished part is processed, i.e., process gates and burrs are removed, and the part is processed by lathing.

This composite T-piece is used for constructing pipelines from the metal-polymeric reinforced pipes 19. It is connected to the pipe 19 via the connecting element 32 completed with the connecting sleeves 40 or 48, or by butt welding of two connecting elements 32, or with the use of a flange connection which is shown in FIG. 10. Also, it is possible to use it for connecting the claimed pipeline to a pipeline made of pipes of other type, such as glass-reinforced plastic, polyethylene, with the use of respective connecting elements 32.

Strength of this composite T-piece 64 is similar to the strength of a metal-polymeric pipe 19. It enables to use the composite T-piece 64 in pipelines constructed from metal-polymeric reinforced pipes without reducing the operating pressure.

FIG. 13B shows a composite branch pipe 73 made according to the same technology as the above-described composite T-piece 64. It comprises a metal branch pipe 74 enclosed in a polymeric casing 75. When forming a metal centerpiece, lengths of a metal framework 71 are welded to ports of the metal branch pipe 74, which lengths correspond to the framework of the metal reinforced pipe 19. Also, in order to strengthen a weld, in some cases it is possible to use metal shells that are welded over the metal framework 71. Then, a polymeric casing 75 is made in a mold.

According to another embodiment of the branch pipe 68, as shown in FIG. 13C, it is formed from two or more lengths of a metal-polymeric pipe (depending on a turning angle) onto which, at its two ends, the connecting elements 32 are mounted.

In order to obtain a required turning angle, the connecting element is either made in a mold with the use of which an end piece with a certain angle of the end cut is made, or the connecting element is processed by cutting for the purpose of obtaining a set angle of the end cut.

It should be noted that the connecting element 32 may be used not only on metal-polymeric reinforced pipes, but also for connecting a pipeline made of metal-polymeric reinforced pipes 19 to glass-reinforced plastic pipes as well as to other types of pipes 58, primarily pipes made of plastic materials, e.g., pipes made of a polymer reinforced with a metal foil, and/or pipes made of a polymer reinforced with a metal band, and/or pipes made of a non-reinforced polymer.

The dimension range (outer diameter) of a metal-polymeric pipe 19, which is used for constructing pipelines in accordance with the present invention, is from 50 mm to 1,000 mm with the pitch of 1 mm (for diameter). The claimed connecting element 32 is made according to the same range, its inner diameter being equal to the outer diameter of pipes to be connected with due regard to allowances and seating fits.

The best embodiments of connection for metal-polymeric reinforced pipes are explained below as Examples, which, in a combination, enable to construct a pipeline of an unlimited length that will be optimized for a specific variant of its application.

EXAMPLE 1

A metal-polymeric reinforced pipe is produced by a method of continuous extrusion molding with the use of the device shown in FIG. 2.

Figure 4:
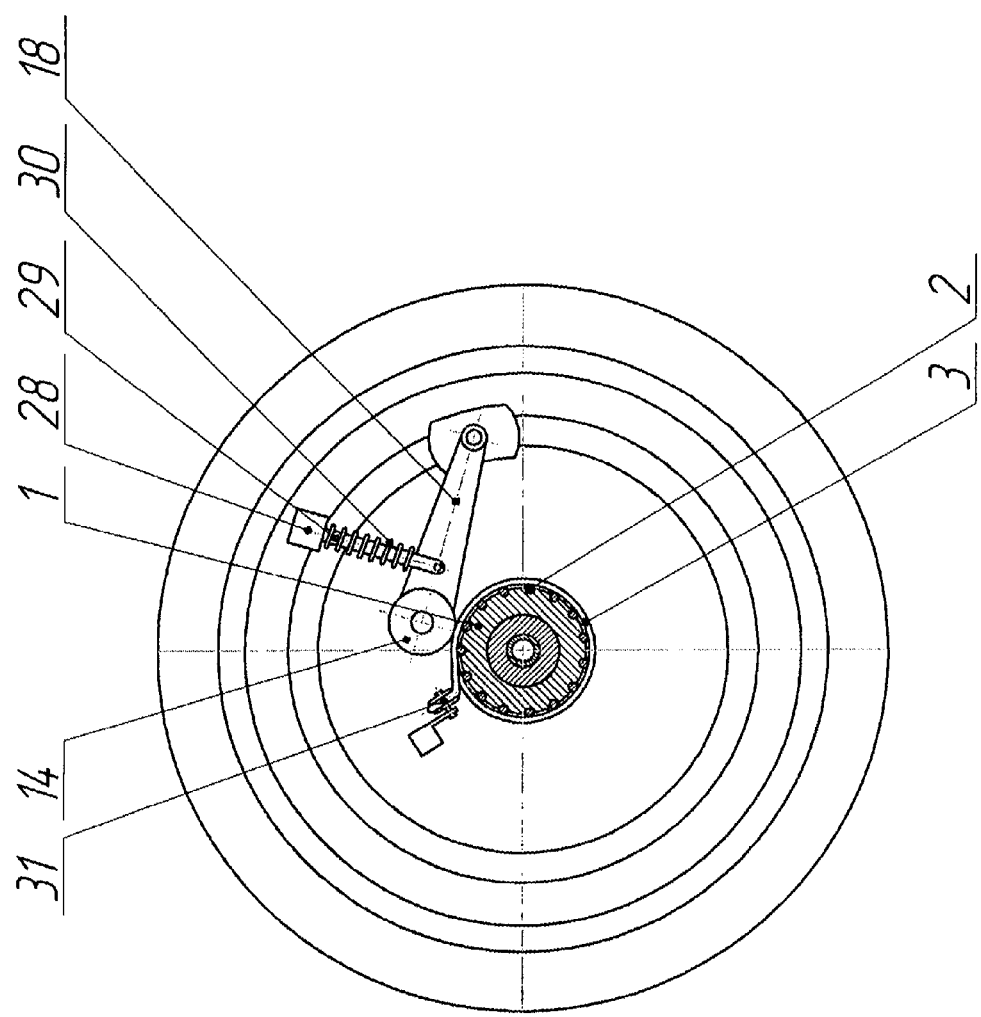
FIG. 4 shows a schematic view of the arrangement of one welding roll electrode on the carousel of the welding machine.

In order to prepare a polymer melt for molding, granulated polyethylene was loaded into the extruder 4, and the polymer melt was fed from the extrusion head 6 via the passage for outputting polymer into the mold cavity 16 formed by the cooled mandrel 10 and the external molding barrel 15, simultaneously feeding a welded reinforcing framework made with the use of one roll electrode, as shown in FIG. 4, into the said cavity. The distributor 27, which guides a melt flow in parallel to the internal surface of the extrusion passage, is arranged before the entrance into the mold cavity 16. The heat-resistant non-metal bush 11, which is mounted before the mandrel 10, is secured to the distributor 27. The heat-resistant bush 11 is made of a material with low heat conductivity. It protects the cooled mandrel 8 against direct thermal action of a melt going out of the passage. At the same time, this bush 11, due to properties of the material it is made of, have no effect on a temperature mode of a moving melt. The selection of a material with low heat conductivity (polymers, ceramics, etc.) for making the heat-resistant bush 11 is conditioned by its intermediate position between the cooled bronze mandrel 10 and the extrusion head 6 which arbor is heated to a temperature of a polymer melt prepared for molding (190-240° C.). The function of the heat-resistant bush 11 is to preclude direct heat transfer from the extrusion head 6 to the mandrel 10, which improves temperature conditions for molding a metal-polymeric pipe.

Figures 5A, 5B:
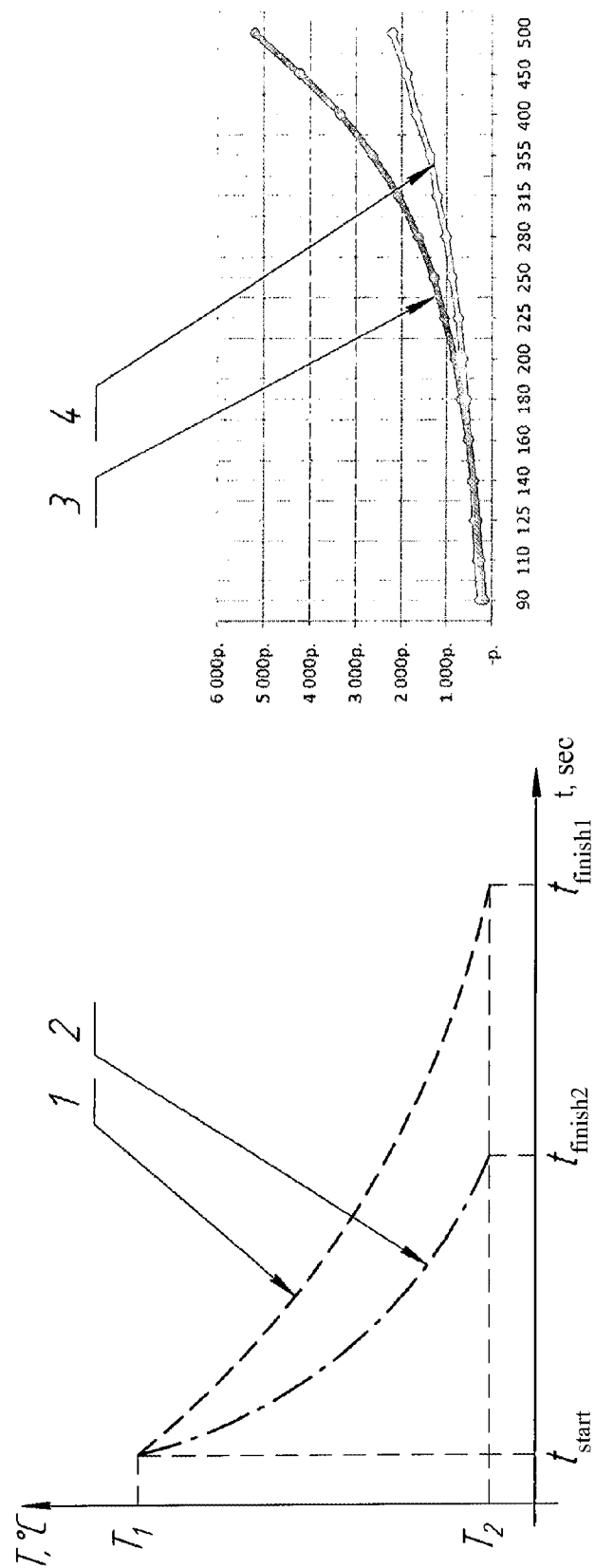
FIG. 5A shows a graph illustration of curves of cooling a polymer melt during production of the claimed metal-polymeric pipe and according to the prototype.
FIG. 5B shows a graph illustration of dynamics of increasing costs for production of the claimed metal-polymeric pipe with increasing pipe diameter, as compared to a non-reinforced polymeric pipe.

After the metal-polymeric pipe 19 left the mold cavity 16, its inner and external surfaces were cooled intensively. The curves of cooling the polymer melt during molding the pipe are shown in FIG. 5A. Curve 1 corresponds to the prototype; Curve 2 corresponds to the claimed method. The cooling time of the polymer from the molding temperature to the room temperature according to the prototype was 245 seconds, and according to the claimed method—86 seconds. Quick cooling enabled to form, primarily, an amorphous structure of the polymer matrix of the reinforced pipe, due to which the long-term strength of the pipe made according to Example 1, as measured during cyclic temperature changes from −40° C. to +80° C., was more than 1,200 cycles, and that of the pipe according to the prototype was from 130 to 245 cycles.

Furthermore, it should be noted that, in order to ensure higher strength, during welding a pressing force and shock pulses were supplied to the roll electrode 14 by the hydraulic actuator, which were synchronized with the time of mutual crossing of the reinforcement longitudinal elements 2 and transverse elements 3, as well as with the time of supplying a current pulse to the roll electrode 14.

To supply shock pulses the shock mechanism 28 (FIG. 4) was used, which comprised a hydraulic cylinder arranged within the rod 29 connected to the hydraulic actuator. That is, a shock pulse is supplied to the shock mechanism 28 by the hydraulic actuator, which pulse is transformed into translational movement of the rod 29 to the opposite end of which the eccentric lever 18 with the roll electrode 14 is secured. Thus, the welding process was combined with forging, which improved strength of each welded connection of the reinforcing framework. The shearing strength of a welded connection of the reinforcing framework longitudinal and transverse elements in each connection point was at least 35 kgf.

Furthermore, in order to continuously press the roll electrode 14 to the reinforcing framework elements to be welded, a pressing device was used that was made as a spring 30 arranged on the rod 29 of the hydraulic cylinder and resting against the lever 18 of the roll electrode. That is, when making a reinforcing framework as a means for forming a coil of the transverse reinforcement elements 3, the roll electrode 14 was used which roll ensures continuous pressing of the transverse reinforcement elements to the longitudinal reinforcement elements due to a force provided by the hydraulic actuator. Steel wire (Steel 3) of round section and having the diameter of 3 mm was used as the transverse and longitudinal reinforcement elements. The guiding device 31 was used for guiding the wire directly under the roll of the electrode 14.

Steel wire (Steel 3) of round section and having the diameter of 3 mm was used as the transverse and longitudinal reinforcement elements.

The dimension range (in outer diameter) of the metal-polymeric pipe thus produced was from 50 mm to 1,000 mm with the pitch of 1 mm (per each diameter).

The following dimension ranges of the reinforcing framework for producing the said pipe were selected:
  reinforcement section: 0.2 to 16 mm, pitch 0.1 mm;
  pitch between the transverse reinforcement elements (coil)—s to 6 s, where s is the transverse reinforcement section (coil), in mm.

It should be noted that the pipe dimension is calibrated according to its inner diameter, contrary to the conventional production technologies for producing polymeric pipes and profiles according to which calibration is performed according to the outer diameter of the product.

The experiments carried out with specimens of the pipes produced in accordance with Example 1 as well as an analysis of the macromolecular structure of the pipe polymer matrix enabled to draw a conclusion that simultaneous use of intensive internal and external cooling gave the possibility of adjusting the speed and depth of polymer cooling for obtaining the pre-determined structure of the polymer matrix based on the amorphous phase of the molded polymer.

Residual stresses in microvolumes of the produced pipe polymer matrix were not more than 2 kg/cm and, practically, had no effect on its durability.

During prolonged operation these insignificant stresses in the polymer matrix relax.

A breaking load during axial tension of the produced pipe is more than 2 times greater than the normative value for metal-polymeric pipes.

Long-term stability of a metal-polymeric pipe produced according to Example 1, as measured at cyclic temperature changes from −40° C. to +80° C., is more than 1,200 cycles.

Long-term stability of the produced pipe made with a butt-to-butt welded connection, when tested at wall stresses 6 MPa and at +80° C. is at least 1,000 hours; at stresses 13.4 MPa—not less than 170 hours; and at stresses 19 MPa—not less than 100 hours.

The metal-polymeric reinforced pipes, which are produced as described above, show high resistance against the action of corrosive agents both of natural and industrial origin, such as sulfurous gas with concentration from 20 to 250 mg/L per day, chlorides with concentration less than 0.3 mg/L per day, various acids and alkalis as well as to the action of sea water and soil-corrosive environment.

The metal-polymeric reinforced pipes, which are produced in accordance with Example 1 with the wall thickness from 11.0 to 12.5 mm, are characterized as having operating pressure of 40 atm, operation temperature mode in the range from −50 to +95° C., impact strength at the level of 427.4 kJ/m$^2$, fatigue ratio of, at least, $0.46 \cdot 10^7$ cycles, number of cyclic loads at 0.4 MPa with frequency of 25 Hz—at least $3 \cdot 10^6$ cycles, thermal expansion coefficient of $2 \cdot 10^5$, tightness at constant pressure for one hour—at least 5-10 MPa (depending on pipe diameter) and safety factor from 2 to 4.75 (depending on pipe diameter in the range from 95 to 225 mm).

The physical-mechanical properties of the pipes produced in accordance with Example 1 are shown in Table 1.

EXAMPLE 2

Metal-polymeric pipes reinforced with a welded metal framework were produced in the same way as in Example 1. The material for molding the pipe polymer matrix was polyethylene corresponding to GOST 16338-85, and various variants of metal-roll, rods and wires were used as the longitudinal and transverse reinforcement elements.

A metal wire or rod of round section with the diameter of 3 mm, of square section with square side of 2.7 mm, of trapezoid section with base of 3 mm and sectional area of 7.1 mm$^2$, of oval section with minimum diameter of 2.5 mm was used for the longitudinal and transverse reinforcement elements. Steels of various grades or alloys based on ferrous and non-ferrous metals, in particular, chrome-, nickel- or copper based alloys were used for producing the longitudinal and transverse reinforcement elements. An alloy for producing the reinforcement was selected under the condition of suitability for electrocontact welding and depends, mainly, on the purpose of a finished product.

The properties of the metal-polymeric pipes reinforced with a welded metal framework produced in accordance with Example 2 are shown in Tables 2-4.

An analysis of the findings shows that the presence of even one flat face in the longitudinal and transverse reinforcement elements increases the contact area during welding of the reinforcing elements therebetween and improves the strength of the whole welded framework as well as indices of allowable axial tensile load and ultimate collapsing pressure for the pipe produced.

The claimed method for producing metal-polymeric pipes reinforced with a welded metal framework, as it is described below, may be carried out with the use of various polymers for forming the body (matrix) of the pipe, in particular, with the use of fluoroplastic, polyesterketone, polyestersulfon, polyurethane, thermoplastic vulcanized elastomers, polyamides and other polymers.

EXAMPLE 3

Metal-polymeric pipes, reinforced with a welded metal framework were produced in the same way as in Example 1. But, as the material for molding the pipe polymer matrix, fluoroplastic-4 was used which had density of 2.12-2.17 kg/m$^3$ and tensile yield point of 12-20 MPa. Fluoroplastic was selected as a polymer having higher chemical stability and heat resistance in comparison with other polymers. In the process of processing fluoroplastic-4 components are added to it that enable to raise the level of polymer cold flow, without compromising its physical-chemical properties. Such additives include graphite, metal sulfides and other antifriction materials.

A pipe was produced that had the outer diameter of 115 mm and could be used at an operation temperature in the range from −150 to +260° C. The ultimate collapsing pressure for this pipe was 7.0 MPa, the allowable axial tensile load was 14.6 tons-force. The pipe properties are presented in Table 5.

EXAMPLE 4

The method for producing metal-polymeric pipes reinforced with a welded metal framework was carried out with the device (FIGS. 2-3) in the same way as in Example 1. For forming the pipe polymer matrix polyesterketone (PEKK) was used that had density of 1.28-1.31 kg/m$^3$ and tensile yield point of 91-112 MPa.

A pipe was produced that had the outer diameter of 160 mm and could be used at an operation temperature in the range from −90 to +260° C. The ultimate collapsing pressure for this pipe was 14.0 MPa, the allowable axial tensile load was 20.4 tons-force. The pipe properties are presented in Table 6.

EXAMPLE 5

The method for producing metal-polymeric pipes reinforced with a welded metal framework was carried out with the device (FIGS. 2-3) in the same way as in Example 1. For forming the pipe polymer matrix polyestersulfon (PES) was used that had density of 1.36-1.58 kg/m$^3$ and tensile yield point of 83-126 MPa.

A pipe was produced that had the outer diameter of 140 mm and could be used at an operation temperature in the range from −100 to +200° C. The ultimate collapsing pressure for this pipe was 16.0 MPa, the allowable axial tensile load was 16.0 tons-force. The pipe properties are presented in Table 7.

EXAMPLE 6

The method for producing metal-polymeric pipes reinforced with a welded metal framework was carried out in the same way as in Example 1. But, the material for forming the pipe polymer matrix was polyurethane of TPU grade that had density of 1.12-1.28 kg/m$^3$ and tensile yield point of 12-70 MPa.

A pipe was produced that had the outer diameter of 115 mm and could be used at an operation temperature in the range from −70 to +170° C. The ultimate collapsing pressure for this pipe was 14.1 MPa, the allowable axial tensile load was 15.0 tons-force. The pipe properties are presented in Table 8.

EXAMPLE 7

The method for producing metal-polymeric pipes reinforced with a welded metal framework was carried out with the claimed device in the same way as in Example 1. The material used for forming the pipe polymer matrix were thermoplastic elastomers TPV (based on polyolefins) that had density of 0.97 kg/m$^3$ and tensile yield point of 2-28 MPa.

A pipe was produced that had the outer diameter of 200 mm and could be used at an operation temperature in the range from −60 to +130° C. The ultimate collapsing pressure for this pipe was 9.4 MPa, the allowable axial tensile load was 24.0 tons-force. The pipe properties are presented in Table 9.

EXAMPLE 8

The method for producing metal-polymeric pipes reinforced with a welded metal framework was carried out with the claimed device in the same way as in Example 1. The material used for forming the pipe polymer matrix was suspension polyvinylchloride (PVC-S) having density of 1.13-1.58 kg/m$^3$ and tensile yield point of 4-7 MPa.

A pipe was produced that had the outer diameter of 115 mm and could be used at an operation temperature in the range from −10 to +70° C. The ultimate collapsing pressure for this pipe was 14.4 MPa, the allowable axial tensile load was 13.8 tons-force. The pipe properties are presented in Table 10.

EXAMPLE 9

The method for producing metal-polymeric pipes reinforced with a welded metal framework was carried out with the claimed device in the same way as in Example 1. The material used for forming the pipe polymer matrix was polyamide (of PA-6, PA-12 grades) having density of 1.02-1.13 kg/m$^3$ and tensile yield point of 80-100 MPa.

A pipe was produced that had the outer diameter of 225 mm and could be used at an operation temperature in the range from −60 to +115° C. The ultimate collapsing pressure for this pipe was 18.6 MPa, the allowable axial tensile load was 10.2 tons-force. The pipe properties are presented in Table 11.

EXAMPLE 10

In order to use for constructing the pipeline, as shown in FIG. 8, a welded connection was made of the metal-polymeric reinforced pipes 19 and 36. For this, the connecting elements 32 and 37 were mounted on thread on each pipe. Then, a flat heating "iron" (not shown in the Figure) was placed so as to be between the end faces of the connecting elements 32 and 37, the "iron" was squeezed with the pipes 19 and 36, and then the end faces of the connecting elements 32 and 37 were heated simultaneously. After reaching the required temperature the pipes 19 and 36 were separated to a small distance, the "iron" was removed, and the two pipes were pressed with opposite forces; in the result a weld 38 was produced. After the connection reaches the ambient temperature, it may be used.

The long-term stability of a polyethylene reinforced pipe made with the above welded connection, when tested with wall stresses of 6 MPa and temperature of +80° C., is at least 1000 hours; at stresses 13.4 MPa—at least 170 hours; and at stresses 19 MPa—at least 100 hours.

EXAMPLE 11

For the purpose of constructing a pipeline a welded permanent connection for metal-polymeric reinforced pipes 19 and 36 was made with subsequent strengthening of the welded connection with a reinforced sleeve 40, as shown in FIG. 9.

This embodiment of the connection enables to construct a pipeline from metal-polymeric reinforced pipes of large diameters (from 275 mm and above), owing to the joint use of a welded connection and threaded connection. This method is most effective for using in pipelines and casing columns of large diameters, since with increasing a pipe outer diameter a load at a connection is also increased.

After mounting the connecting elements (end pieces) 32 and 37 onto the pipes 19 and 36, they were welded at their end faces with the use of a heating iron, in the same way as in Example 10, for producing the weld 38, and the external surface of the welded connecting elements 32 and 37 were provided with thread 39. The next step is screwing of a connecting sleeve 40. As the sleeve 40, a length of a metal-polymeric pipe with a diameter greater than that of the pipes 8 and 9 to be connected may be used, i.e., an inner diameter of the sleeve 40 is equal to the outer diameter of the connecting elements 32 and 37. Complementary thread 41 is made on the internal surface of the sleeve 40 on two ends, which enables to screw the sleeve 40 onto the bushes of the connecting elements 32 and 37 for the purpose of strengthening the welded connection 38 of the pipes 19 and 36. In order to protect the reinforcement against corrosion, the sleeve 40, which is made as a length of a metal-polymeric pipe, comprises protective polymeric rings 42 covering reinforcements visible at the end faces.

EXAMPLE 12

This Example (FIG. 10) presents a detachable flange connection of the metal-polymeric reinforced pipes 19 and 36, which is made with the use of the claimed connecting elements 43.

The connecting elements 43 are processed for arranging flanges 45 by making an external groove with a chamfer 44, as shown in FIG. 10. The flange 45 is a ring with holes disposed circumferentially. The internal annular surface of each flange 45 is provided with a conical chamfer with a cone angle corresponding to a cone angle of the chamfer 44 on the external side of the connecting element 43.

The two pipes 19 and 36 provided with the flanges 45 are assembles into a pipeline with the use of studs 46 and nuts 47. In order to seal the pipe flange connection, gaskets 76 are used that are arranged in annular grooves made in the end faces of the connecting elements 43.

EXAMPLE 13

For the purpose of constructing a pipeline a detachable sleeve connection for the metal-polymeric reinforced pipes 19 and 36 was made (as shown in FIG. 11) with the use of the connecting elements 32 and 37. The external surface of the connecting elements 32 and 37 was provided with cylindrical thread 39. As a connecting sleeve 48 a length of a metal-polymeric pipe with a diameter greater than that of the pipes 19 and 36 to be connected was used. The inner diameter of the sleeve 48 corresponded to the outer diameter of the connecting elements 32 and 37. The metal reinforcing framework of the sleeve 48 is protected at its ends by welded rings 42 made of the same polymeric material as the sleeve 48. The internal surface of the sleeve 48 is provided on its two sides with complementary thread corresponding to thread 39 on the external surface of the connecting elements 32 and 37.

A polymeric ring 49, which is installed in the connection, serves as a seal as well as enables to eliminate a pocket in the longitudinal section of a pipeline.

EXAMPLE 14

This Example illustrates a transition in the claimed pipeline from a metal-polymeric pipe 19 to a metal pipe 50 with the use of a connecting element 51 fixed at the end of the pipe 19 by using a threaded connection, as shown in FIG. 12.

The rear portion of the connecting element 51 is provided with a chamfer 52 for the tapered mounting surface of a metal bush 53 covering the external circumference of the connecting element 51 and tight fit onto the latter. A metal barrel 56 is screwed onto the bush 53 along thread 54, 55 until stop. After the bush 53 and the barrel 56 are mounted, the barrel 56 is welded to the metal pipe 50 along the external contour with a weld 57.

According to another embodiment, the connecting element 51 and the bush 53 are secured to each other with thread (not shown in the Figure).

EXAMPLE 15

This Example illustrates possibilities of the claimed metal-polymeric reinforced pipes for constructing a pipeline having an adapter connection shown in FIG. 6 at an upper branch of a pipeline, which connection comprises a transition from a metal-polymeric pipe 19 to a polyethylene non-reinforced pipe having the outer diameter (Ø) of 200 mm, the inner diameter (Di) of 150 mm and designed for an operating pressure (Po) up to 12 atm. The connection is made by butt welding of the end face of the polyethylene pipe 58 and the connecting element 32. The welded connection is strengthened by a sleeve mounted on thread over the welded connection according to the procedure described above.

The pipeline is constructed with due regard to the requirements for a water supply pipeline (as well as for pipelines for sewers or hot water supply). For these purposes polymeric pipes, which are made of polyethylene or polypropylene, pipes of glass-reinforced plastic, pipes of metals (iron alloys) or pipes of composite materials, are used. Agents transported through these pipelines include water, water having solid inclusions, vapor. The pipeline operating pressure is up to 16 atm, working temperature in from 5 to 75° C.

Let's consider advantages that may be obtained by constructing a water supply pipeline with a transition to the claimed metal-polymeric pipe from a polyethylene non-reinforced pipe 58 having the outer diameter of 200 mm, the wall thickness of 25 mm (wall thickness index SDR=pipe diameter/wall thickness=9). A water supply pipeline made of polyethylene of PE-100 grade, according to calculations involving material strength and pipe wall thickness, has the operating pressure of 12 atm (1.2 MPa). In order to make a connection, we select a metal-polymeric reinforced pipe with the corresponding inner diameter (nominal bore) equal to 180 mm, with the wall thickness of 12.5 mm, Di-155.

In this case the main advantages of the metal-polymeric pipe 19 over a polyethylene pipe are great strength and great flexibility at equal throughput. The strength of a metal-polymeric pipe is measured by its resistance to axial, radial and other loads. In this case the metal-polymeric reinforced pipe MPT-180 may withstand inner pressure P max=80 atm, and the resistance in the axial direction is F=227.5 kN (a polyethylene pipe—app. 58 kN).

Meanwhile, it is necessary to take into account that a metal-polymeric reinforced pipe, with due regard to its strength, has sufficient flexibility for compensating external loads. This is possible due to the "framework-polymer" system that works in a reinforced pipe. A polyethylene non-reinforced pipe has no sufficient flexibility, and this factor is reduced in proportion to an increase in the wall thickness. The metal framework, on the contrary, is strengthened proportionally to an increase in the pipe diameter due to an increase in a number of longitudinal reinforcing elements, while the wall thickness of the pipe may remain unchanged.

An increase of a transported product pressure within a pipeline constructed from the claimed metal-polymeric reinforced pipes enables to raise the efficiency of using such a pipeline, reduce costs and increase profitability.

A comparison of material costs for producing one linear meter of the pipe is shown in FIG. 5B. This comparison is based on calculation of a specific weight and prices for corresponding materials. In the production of a metal-polymeric pipe the cost of steel St3 for making a framework is 28 RUR/kg and the cost of polyethylene of grade 100 is 67 RUR/kg, and, thus, we obtain that the cost of one linear meter of a metal-polymeric pipe MPT-180 is 588.60 RUR, and that of a polymeric non-reinforced pipe PE-100 is 676.70 RUR. The weight of one linear meter of the pipes is 13.5 and 10.1 kg, respectively.

An increase in the wall thickness of a polymeric non-reinforced pipe leads to an increase in the polymer volume that should be spent for its production; this means an increase in the material cost for producing one linear meter of the pipe. Thus, if it necessary to increase the pipe inner diameter, the construction of a pipeline from the claimed metal-polymeric reinforced pipe is more advantageous from the economic point which is illustrated by Curve 4 in FIG. 5B. Curve 3 in FIG. 5B shows a leading increase in the cost of a polymeric non-reinforced pipe with an increase in the pipeline inner diameter.

EXAMPLE 16

This Example illustrates advantages that may be obtained, if a gas pipeline is constructed with a transition to the claimed metal-polymeric pipe from a polyethylene non-reinforced pipe 58 with the outer diameter of 500 mm.

A pipeline constructed from polyethylene non-reinforced pipes (having the outer diameter of 500 mm, the inner diameter Di=388.8 mm; design operating pressure Pn=12 atm) may be equally replaced by a pipeline made of metal-polymeric reinforced pipes MPT-450, which has the following physical-technical characteristics: outer diameter—450 mm, Di—416 mm, wall thickness—17 mm, operating pressure Pn—30 atm. The comparative weight of one linear meter of the pipes: MPT-450 is 40.7 kg, and that of the polyethylene (non-reinforced) pipes PE-500 is 78.32 kg.

This comparison proves a reduction of the total weight of a pipeline constructed from metal-polymeric reinforced pipes and an increase of the operating pressure of a product transported therein. Furthermore, as was already mentioned, a polyethylene non-reinforced pipe loses its flexibility and capacity to withstand elastic deformations with an increase in its wall thickness, which, in this case, is one more negative factor for assessing the pipeline strength. The reinforcing framework of metal-polymeric reinforced pipes enables not to increase the pipe wall thickness with an increase in the inner diameter, since it takes most loads, while preserving sufficient flexibility and capacity to relax stresses in the pipe body.

Gas-supply networks made of metal-polymeric reinforced MPT pipes are scores of times more reliable than polymeric and composite pipes, especially in seismically dangerous regions with a complex geological situation.

EXAMPLE 17

This Example illustrates advantages that may be obtained, if an oil pipeline is constructed with a transition to the claimed metal-polymeric pipe 19 from metal pipes 50 having the outer diameter of 500 mm (inner diameter Di=468 mm; operating pressure Pn=20 atm).

As compared to a metal pipe (material—Steel 20), metal-polymeric reinforced pipes have the following advantages: chemical stability, corrosion resistance, weight and cost.

In order to replace the said metal pipe, the metal-polymeric reinforced MPT-500 pipe is selected (outer diameter—500 mm; inner diameter Di=464 mm; operating pressure Pn=20 atm).

The weight of one linear meter of a metal-polymeric pipe MPT-500 is 46.8 kg; and that of a pipe made of Steel 20 with the diameter of 500 mm is 191.2 kg. A great weight of a metal pipe, as compared to that of a metal-polymeric MPT pipe, is a significant disadvantage during mounting, operation and repair of a pipeline.

The cost of the materials required for making a metal-polymeric MPT-500 pipe is 2,191.8 RUR/linear meter; that of a pipe made of Steel 20 with the diameter of 500 mm is 5,353.6 RUR/linear meter.

It follows from the above data that a metal-polymeric reinforced MPT pipe is not inferior to a metal pipe as to the radial strength. The polymer chemical stability enables to operate such a pipeline without a major repair and replacement for much more time than a similar pipeline made of metal pipes.

If, for the purpose of increasing the operation period of a steel pipeline, pipes of corrosion-resistant steels and alloys are used instead pipes made of quality steels, e.g., Steel 20 or similar, than the material cost, as compared to that of MPT pipes, is app. 30 times greater, and, consequently, the cost of laying such a pipeline will be increased greatly.

The cost-effectiveness of replacement of metal pipes by metal-polymeric reinforced pipes is most evident on the basis of expenses and operation periods of networks until the next major repair or replacement.

Also, when comparing a weight of one linear meter of pipes made of iron alloys and that of MPT pipes, difference will appear in pipe transportation and mounting expenses also, since metal pipes are 2.5 times heavier than MPT pipes and, correspondingly, require other equipment and labor.

From the point of quality of the pipe internal surface, it should be noted that the surface of a metal-polymeric MPT pipe along the inner diameter is formed by the mandrel polished surface within an extrusion head, which is reflected in roughness of the inner surface of a finished pipe—Ra 0.25-Rz 1.25. A metal pipe has roughness of its internal surface that is regulated by the respective standard and defined within the limits of Ra 6.3-Ra 50. Due to this, hydrodynamic losses in a pipeline made of a metal will be significantly greater than those in a pipeline made of a metal-polymeric MPT pipe.

EXAMPLE 18

A pipeline, which fragment is shown in FIG. 6, was constructed from the metal-polymeric reinforced pipes 19 produced in accordance with the claimed invention with the use of the connecting elements 32. The pipeline was constructed with due regard to the requirements established for transportation of a well product while producing oil and gas. For these purposes polymeric pipes made of polyethylene, glass-reinforced plastic, or of a metal (iron alloys), or of composite materials. Transported agents are: oil, gases, combustible gases, technological liquids. Operating pressure in a pipeline is up to 40 atm, operating temperature is from 10 to 80° C.

One specific feature of using pipeline transport in the oil and gas industry is that well products exert very strong chemical action on a pipeline. Due to this, in the result of corrosion process, metal pipes have a comparatively short service life until their replacement. In these conditions polymeric pipelines are much more efficient.

A pipeline constructed from metal-polymeric reinforced pipes may be operated at a hydrogen sulfide concentration higher than 16%, which enables to use them instead of pipes made of special steels and aluminum when constructing pipelines in sites with high content of sulfides.

Common polymeric pipes may not be used in these conditions due to their low strength. Composite pipes (glass-reinforced plastic) have low axial strength in points of connection and do not ensure sufficient reliability of the pipeline operation.

EXAMPLE 19

A pipeline, which fragment is shown in FIG. 6, was constructed from the metal-polymeric reinforced pipes 19 produced in accordance with the claimed invention with the use of the connecting elements 32. The pipeline was constructed with due regard to the requirements applied to pipelines for underground and heap leaching of non-ferrous and rare-earth metals in hydrometallurgy.

A combination of strength in the axial and radial directions and chemical stability allow to consider a metal-polymeric reinforced pipe as the most reliable among polymeric pipes used in hydrometallurgy for leaching of ores. In hydrometallurgy it is possible to use metal-polymeric reinforced pipes, in particular, as a casing column when developing deposits, as a pipe string for conservation of mines, as a pipeline for transportation of metal salt solutions. The structure of the claimed pipeline made of metal-polymeric reinforced pipes withstands an earthquake with magnitude of 9. Only pipelines made of highly alloyed stainless steel are the only equivalent, pipes for which are 30 times more expensive than metal-polymeric reinforced pipes.

EXAMPLE 20

A pipeline, which fragment is shown in FIG. 6, was constructed from the metal-polymeric reinforced pipes 19 produced in accordance with the claimed invention with the use of the connecting elements 32. The pipeline was constructed with due regard to the requirements applied to pipelines for pneumatic transport of cement and abrasive materials.

At present, pipelines made of steel or composite pipes are usually used for pneumatic transport of cement and abrasive materials.

As compared with a pipeline made of metal-polymeric reinforced pipes, a disadvantage of a pipeline made of metal pipes is a great specific weight of metal pipes and their poor wear resistance. Wear resistance of metal-polymeric reinforced pipes is 4-10 times greater than that of steel pipes. From the economic point it is manifested in a short term of operation of a metal pipeline.

Polymeric non-reinforced pipelines do not have rigidity sufficient for the above-said purpose; therefore, structures made of polymeric non-reinforced pipes intended for pneumatic transport of cement and abrasive mixtures are to be further strengthened with girders and supports, which complicates the construction of such an object and increases its cost.

EXAMPLE 21

A pipeline, which fragment is shown in FIG. 6, was constructed from the metal-polymeric reinforced pipes 19 produced in accordance with the claimed invention with the use of the connecting elements 32. The pipeline was constructed with due regard to the requirements applied to pipelines used in the chemical industry, in particular, for transportation of concentrated acids and alkalis.

The chemical industry sets higher requirements to pipeline transport, which relate, first of all, to chemical (corrosion) stability of the material a pipe is made of, strength and tightness of connections in a pipeline.

Common steel pipes and pipelines made of them do not suit for transportation of concentrated acids and alkalis. In such conditions only corrosion-resistant alloys, stable to corrosive media, may be applied. Also, special coatings are necessary that are applied to surfaces of metal pipes for keeping them intact.

The cost of materials for producing pipes from stainless steels and alloys as well as the construction costs of such pipelines will be significantly higher than the cost of materials for producing metal-polymeric reinforced pipes and expenses for constructing a pipeline from them. The construction of a pipeline from metal-polymeric reinforced pipes (MPT) for transportation of chemical agents does not differ, as to technical work, from the construction of a pipeline from MPT for water supply or oil product transportation, since a pipeline made of MPT is leakproof and does not require any additional measures for maintaining tightness. The chemical stability of the MPT polymer is sufficient for transportation of corrosive agents without compromising the pipe wall integrity. No special coatings are required for the internal and external surface of such a pipeline. Pipe connections made with the use of the connecting elements 32, connecting sleeves 40 and 48, flange connections 45 and other structures described in this specification ensure reliable tightness necessary in this application.

EXAMPLE 22

This Example described the application of the metal-polymeric reinforced pipes 19 produced in accordance of the claimed invention and intended for use in corrosive environment in contact with sea water, e.g., for creating sea infrastructure as well as for cost protection for constructing ports and docks. The claimed metal-polymeric reinforced pipes also may find application for constructing pipelines for transportation of salt water for desalination, for constructing pipelines in saline soils, for laying any pipelines in the marine environment as well as for constructing platforms for producing oil and gas.

High strength of metal-polymeric reinforced pipes and possibility of filling their internal space with concrete enables to use MPT pipes as supports for various facilities in the conditions of external corrosive environment. The welded metal framework, which provides the claimed pipe with high-strength characteristics, is protected by a polymer all around, therefore, during contact with salt water no oxidation processes on the metal framework occur both inside a pipe and on the outside, due to which the pipe strength remains an invariable parameter.

The requirements to strength and stability of pipes and pipelines made of them that are used in the marine environment are similar to those for pipes for the chemical industry.

As compared to polyethylene pipes, metal-polymeric reinforced pipes have a number of advantages that are more manifested with an increasing pipe diameter and include a lower cost of materials for production, a lower weight and a lesser wall thickness with higher values of strength indices in the axial and radial directions.

EXAMPLE 23

This Example illustrates the application of the metal-polymeric reinforced pipes 19 as supports and piles used for construction of buildings and structures.

In the process of constructing various buildings and structures it is necessary to stabilize the soil under the foundation for the purpose of preventing soil layers from possibly displacing relative to each other, which can lead to destruction of the foundation and the whole structure. Common piles for these purposes are produced from reinforced concrete. However, in a number of construction cases it is possible to use metal-polymeric reinforced pipes instead of piles or supports made of reinforced concrete.

In a number of cases this is based on circumstances that are manifested in advantages of metal-polymeric reinforced pipes over concrete piles. For example, if there exists a possibility of washing soils with underground waters, then the service life of common reinforced concrete piles is shortened, which may result in their destruction and, consequently, in violation of the structure foundation stability. Furthermore, metal reinforcement of piles is subject to corrosion and fails while being in the soil wet environment, thus losing its capacity of maintaining the pile integrity. Contrary to this, high strength characteristics of the welded framework used in the claimed pipe are ensured by a polymer covering the framework all around. Therefore, during contact with underground waters no oxidation processes on the metal framework occur, due to which the pipe strength does not change with the course of time.

The main applications of metal-polymeric reinforced pipes are shown in Table 12.

TABLE 1

Physical-mechanical properties of pipes produced by the claimed method.

| | Pipe outer diameter, in mm | Axial tensile load, in tons-force (kN), at least | Ultimate breaking pressure, in MPa (kg-force/cm²) | Weight of one linear meter, in kg |
|---|---|---|---|---|
| 1. | 95 | 11 (110) | 19.0 (190) | 6.7 |
| 2. | 115 | 14 (140) | 15.0 (150) | 8.3 |
| 3. | 125 | 15 (150) | 14.2 (142) | 9.1 |
| 4. | 140 | 16 (160) | 13.0 (130) | 10.1 |
| 5. | 160 | 20 (200) | 11.5 (115) | 11.8 |
| 6. | 180 | 22 (220) | 10.4 (104) | 13.6 |
| 7. | 200 | 24 (240) | 9.0 (90) | 15.2 |
| 8. | 225 | 28 (280) | 8.0 (80) | 17.2 |

TABLE 2

Properties of pipe produced by the claimed method, when metal framework therefor includes metal reinforcement of round section and polyethylene matrix.

| | Outer diameter, in mm | Axial tensile load, in tons-force, at least | Wire diameter, in mm | Ultimate breaking pressure, in MPa | Operation temperature, °C. | Weight of one linear meter, in kg |
|---|---|---|---|---|---|---|
| 1. | 125 | 15 | 3 | 14.2 | −50-+95 | 9.1 |
| 2. | 180 | 22 | 3 | 10.4 | −50-+95 | 13.6 |
| 3. | 200 | 24.2 | 3 | 9 | −50-+95 | 15.2 |

TABLE 3

Properties of pipe produced by the claimed method, when metal framework therefor includes metal reinforcement of square section and polyethylene matrix.

| | Outer diameter, in mm | Axial tensile load, in tons-force | Dimension of side of wire section square, in mm | Ultimate breaking pressure, in MPa | Operation temperature, °C. | Weight of one linear meter, in kg |
|---|---|---|---|---|---|---|
| 1. | 125 | 18.2 | 2.7 | 15.1 | −50-+95 | 9.1 |
| 2. | 180 | 25.6 | 2.7 | 11.3 | −50-+95 | 13.6 |

TABLE 4

Properties of pipe produced by the claimed method with the use of metal reinforcement of trapezoid section as longitudinal elements and metal reinforcement of round section with diameter of 3 mm as transverse elements of the reinforcing framework and polyethylene matrix.

| | Outer diameter, in mm | Axial tensile load, in tons-force | Dimension of trapezoid base, in mm | Ultimate breaking pressure, in MPa | Operation temperature, °C. | Weight of one linear meter, in kg |
|---|---|---|---|---|---|---|
| 1. | 160 | 23.2 | 3 | 14.6 | −50-+95 | 11.7 |
| 2. | 225 | 31 | 3 | 9.3 | −50-+95 | 17.2 |

TABLE 5

Properties of pipe produced by the claimed method with the use of fluoroplastic-4 as the polymer matrix.

| | Outer diameter, in mm | Axial tensile load, in tons-force | Ultimate breaking pressure, in MPa | Operation temperature, °C. | Weight of one linear meter, in kg |
|---|---|---|---|---|---|
| 1. | 115 | 14.6 | 7.0 (190) | −150-+260 | 11.6 |

TABLE 6

Properties of pipe produced by the claimed method with the use of polyesterketone of PEKK grade as the polymer matrix.

| | Outer diameter, in mm | Axial tensile load, in tons-force | Ultimate breaking pressure, in MPa | Operation temperature, ° C. | Weight of one linear meter, in kg |
|---|---|---|---|---|---|
| 1. | 160 | 20.4 | 14.0 | −90-+260 | 15.1 |

TABLE 7

Properties of pipe produced by the claimed method with the use of polyestersulfon of PES grade as the polymer matrix.

| | Outer diameter, in mm | Axial tensile load, in tons-force | Ultimate breaking pressure, in MPa | Operation temperature, ° C. | Weight of one linear meter, in kg |
|---|---|---|---|---|---|
| 1. | 140 | 16.0 | 16.0 | −100-+200 | 14.2 |

TABLE 8

Properties of pipe produced by the claimed method with the use of polyurethane of TPU grade as the polymer matrix.

| | Outer diameter, in mm | Axial tensile load, in tons-force | Ultimate breaking pressure, in MPa | Operation temperature, ° C. | Weight of one linear meter, in kg |
|---|---|---|---|---|---|
| 1. | 115 | 15.0 | 14.1 | −70-+170 | 10.0 |

TABLE 9

Properties of pipe produced by the claimed method with the use of thermoplastic vulcanized elastomers as the polymer matrix.

| | Outer diameter, in mm | Axial tensile load, in tons-force | Ultimate breaking pressure, in MPa | Operation temperature, ° C. | Weight of one linear meter, in kg |
|---|---|---|---|---|---|
| 1. | 200 | 24.0 | 9.4 | −60-+130 | 15.2 |

TABLE 10

Properties of pipe produced by the claimed method with the use of PVC-S (suspension polyvinylchloride) as the polymer matrix.

| | Outer diameter, in mm | Axial tensile load, in tons-force | Ultimate breaking pressure, in MPa | Operation temperature, ° C. | Weight of one linear meter, in kg |
|---|---|---|---|---|---|
| 1. | 115 | 13.8 | 14.4 | −10-+70 | 10 |

TABLE 11

Properties of pipe produced by the claimed method with the use of polyamides PA-6 and PA-12 as the polymer matrix.

| | Outer diameter, in mm | Axial tensile load, in tons-force | Ultimate breaking pressure, in MPa | Operation temperature, ° C. | Weight of one linear meter, in kg |
|---|---|---|---|---|---|
| 1. | 225 | 32.0 | 10.2 | −60-+115 | 18.6 |

TABLE 12

Main applications of metal-polymeric reinforced pipes.

| | Pipeline purpose | Product to be transported | Laying arrangement | Operating pressure (max), in MPa | Ambient temperature, ° C. |
|---|---|---|---|---|---|
| 1. | Gas distribution networks | Gas | Buried, surface | 4.0 | −45-+60 |
| 2. | Oil product pipelines | Gasoline, fuel oil, kerosene | Buried, surface | 4.0 | −45-+60 |
| 3. | Industrial pipelines | Air, water, gas, acids, alkalis | Buried, surface | 4.0 | −45-+60 |
| 4. | Industrial pipelines | Dry suspended matter, dust, bulk products, pulp | Buried, surface | 4.0 | −45-+60 |
| 5. | Field pipelines | Produced water, oil, gas | Buried, surface | 4.0 | −45-+60 |
| 6. | Water supply pipelines | Drinking and process water, sewage | Buried, surface | 4.0 | −45-+60 |
| 7. | Casing pipes | Underground leaching with the use of acids | Wells | 4.0 | −45-+60 |

I claim:

1. A method for producing a metal-polymeric pipe by extrusion molding, comprising the steps of:
   feeding a polymer melt from an extrusion head into a mold cavity being comprised of a heat-resistant non-metal bush, a mandrel after the bush, and an external mold barrel around the bush and said mandrel;
   welding a metal reinforcing framework comprised of longitudinal reinforcement elements and transverse reinforcement elements, the step of welding being comprised of:
   coiling said transverse reinforcement elements around said longitudinal reinforcement elements;
   constantly pressing said transverse reinforcement elements to said longitudinal reinforcement elements by a roll electrode with a force applied by a hydraulic actuator; and
   synchronizing mutual crossing of said longitudinal reinforcement elements and said transverse reinforcement elements with pulses to said roll electrode;
   simultaneously feeding of said welded metal reinforcing framework into said mold cavity so as to form a molded pipe; and
   cooling an internal surface of said molded pipe within said molded cavity and after the bush, and after said molded cavity, and an external surface of said molded pipe after said molded cavity so as to produce a polymer matrix with a molecular structure based on an amorphous phase.

2. The method according to claim 1, wherein said polymer matrix comprises an amorphous phase in an amount of 60-90% of total polymer volume.

3. The method according to claim 1, wherein the step of cooling further comprises the steps of:
- compressing air and a cooling liquid into a cooling agent as a mist so as to cool said external surface of said molded pipe;
- feeding a cooling liquid into an inner cavity of said molded pipe; and
- filling a space between said mandrel and a plug arranged within said molded pipe so as to cool said internal surface of said molded pipe, said mandrel being between the bush and said space, said space being between said mandrel and said plug.

* * * * *